United States Patent [19]

Sanderman

[11] Patent Number: 5,794,006

[45] Date of Patent: Aug. 11, 1998

[54] SYSTEM AND METHOD FOR EDITING CONTENT IN AN ON-LINE NETWORK

[75] Inventor: David S. Sanderman, Redmond, Wash.

[73] Assignee: Microsoft Corporation, Redmond, Wash.

[21] Appl. No.: 516,576

[22] Filed: Aug. 18, 1995

[51] Int. Cl.$^6$ .................................................. G06F 19/00
[52] U.S. Cl. ..................... 395/500; 395/329; 395/330; 395/331; 395/332; 395/701
[58] Field of Search ........................ 395/500, 329–332, 395/200.03, 200.09, 200.01, 701, 335

[56] References Cited

U.S. PATENT DOCUMENTS

| | | | |
|---|---|---|---|
| 4,799,156 | 1/1989 | Shavit et al. | 364/401 |
| 4,821,211 | 4/1989 | Torres | 364/521 |
| 5,295,244 | 3/1994 | Deu et al. | 395/161 |
| 5,347,632 | 9/1994 | Filepp et al. | 395/200 |
| 5,355,497 | 10/1994 | Cohen-Levy | 395/700 |
| 5,396,626 | 3/1995 | Nguyen | 395/700 |
| 5,410,691 | 4/1995 | Taylor | 395/600 |
| 5,537,546 | 7/1996 | Sauter | 395/200.01 |
| 5,539,886 | 7/1996 | Aldred et al. | 395/200.04 |
| 5,555,244 | 9/1996 | Gupta et al. | 370/60.1 |
| 5,572,643 | 11/1996 | Judson | 395/793 |

OTHER PUBLICATIONS

"Information Services and Group Activities in a National Information Infrastructure", J. D. Figgs, Telecommunications, pp. 302–307, Mar. 1995.

"Design and Implementation of a Desktop Computer Supported Cooperative Work System", Tsonga Mino Chen et al., IEEE pp. 827–835, Sep. 1994.

"The write stuff: Security Issues for Customer Network Management of Broadband Data Services", Tracy Brown et al., IEEE pp. 154–161; 1993.

"IBM's Network Management Approach" Randall Campbell et al., IEEE pp. 70–75, Mar. 1990.

*Primary Examiner*—Kevin J. Teska
*Assistant Examiner*—A. S. Roberts
*Attorney, Agent, or Firm*—Schwegman, Lundberg, Woessner & Kluth, P.A.

[57] ABSTRACT

The on-line content editing system of the present invention operates as an extension of a computer's operating system to provide a graphical interface which displays system operator editing menus. Using multiple node editors, the editing system allows system operators to create, modify, link, unlink and delete content nodes in the on-line network. The editing system further allows a system operator to organize services and information content independent of a specific hardware implementation. This allows, for instance, a system operator to manage subsections of the on-line network regardless of where those subsections actually reside in the on-line network hardware. Furthermore, the editing system allows service providers to create specialized node editors. These specialized node editors are then used by multiple system operators to manage their assigned subsections of the on-line network. In addition, the editing system automatically identifies and invokes the proper node editor for a selected content node.

59 Claims, 23 Drawing Sheets

NODE EDITOR

NODE EDITOR TABLE /—800

| APPLICATION IDENTIFIER | INSTANCE |
|---|---|
| 0X0001H | MEMORY LOCATION OF DIRECTORY SERVICE NODE EDITOR |
| 0X0002H | MEMORY LOCATION OF BULLETIN BOARD NODE EDITOR |
| 0X0004H | MEMORY LOCATION OF CHAT NODE EDITOR |

NEW NODE INFORMATION TABLE /—802

| APPLICATION IDENTIFIER | DATA SET | NAME |
|---|---|---|
| 0X0001H | 0 | DIRECTORY SERVICE |
| 0X0002H | 0XFFFFFH | BULLETIN BOARD SERVICE |
| 0X0003H | 0 | CHAT SERVICE |

CREATION OF A NEW NODE

DISPLAY AND MODIFICATION OF AN
EXISTING NODE'S PROPERTIES

Movie Reviews BBS Properties

| General | Context |

Language: English (united States)

Topics: None
People: None specified
Place: The World
Time: All of history

Forum manager: To Be Announced
Owner: MICROSOFT CORPORATION

Created: 3/1/95 3:00 AM
Last changed: 6/15/95 12:53 AM
Size:

OK  Cancel  Apply

FIG. 18B

NODE DELETION

SYSTEM AND METHOD FOR EDITING CONTENT IN AN ON-LINE NETWORK

BACKGROUND OF THE INVENTION

FIELD OF THE INVENTION

This invention relates to on-line network communication systems and, more particularly, to a system for editing and organizing the content of an on-line network.

BACKGROUND

Commercial, interactive on-line network systems are presently growing rapidly in size and complexity. Consequently, a single entity cannot economically provide all the content of such on-line networks. Thus, in large commercial, interactive on-line networks, the on-line network provider assigns many third-party providers to supply additional services and offerings. These additional services and offerings then become part of the on-line network content.

While these third-party providers supply the content, the on-line network provider typically retains responsibility for the organization and management of the content. Typically, an on-line network provider organizes and manages the various services and offerings with a group of system operators (also called Sysops) that are employed by the on-line network provider.

As the size and complexity of an on-line network increases, however, the burden placed upon the on-line network provider to manage and organize the content of the on-line network also increases. As can be appreciated, on-line network providers need to minimize the costs of managing the content of the on-line network in order to make the network affordable to end-users. Accordingly, an easy to use, flexible, and extensible editing system is needed which reduces the cost of managing and organizing the content of an on-line network.

SUMMARY OF THE INVENTION

The present invention provides an enhanced editing system which optimizes the organization, editing, and management of content within an interactive on-line system. Furthermore, the editing system of the present invention allows third-party providers to manage assigned subsections of the on-line network.

On-line network system operators spend a significant amount of time providing an organizational structure for the on-line offerings, creating new offerings, editing existing offerings, and deleting unneeded offerings. Conventional on-line providers, however, do not provide an intuitive, easy to use editing system which allows a wide variety of third-party content providers and end-users to manage their own subsections of the on-line network. The editing system of the present invention, in contrast, allows third-party providers to not only supply information content to an on-line network but also retain the responsibility of organizing and maintaining the supplied content in the on-line network. To provide such features, third-party providers are given system operator privileges for their assigned subsections of the on-line network and an editing system which allows them to manage the content within their assigned subsections. Advantageously, the editing system of the present invention is intuitive, easy-to-use and does not need specialized training to operate.

Furthermore, the editing system of the present invention is integrated with the operating system in an end-user's computer so as to provide a consistent user interface and a common property modification interface. For example, in the preferred embodiment, the on-line network user interface is called the Network Explorer and it acts as an extension to the Win 95 Explorer a product developed by the Microsoft Corporation. The Win 95 Explorer is the part of the Win 95 operating system. The editing system in the present invention provides a graphical interface which displays menus and tool bars which are similar to the menus and tool bars displayed by an end-user's local operating system.

This generalized menu and tool bar approach provides a system operator with a consistent mechanism for creating new offerings, editing existing offerings and deleting unneeded offerings in his assigned area on the on-line network. When an end-user enters an area where the end-user has system operator rights, familiar menus appear which allow the end-user to interact with the editing system in a natural way.

With the editing system of the present invention, the on-line network provider can assign a third-party provider to manage and supervise a subsection of the on-line network. The on-line network contains a plurality of services. These services contain a plurality of content entities. The on-line network provider assigns a subsection of the content entities to particular third-party providers. The third-party providers then use the editing system to edit the organization of their assigned content entities and the content contained therein.

The editing system of the present invention comprises several component modules. In the preferred embodiment, the component modules of the on-line network editing system include a computer shell module, a network shell module, and multiple editor modules. The computer shell module is the user interface which appears on a user's computer. When a user runs an operating system on his local computer, the computer shell module provides a user interface which displays the files and programs stored on the user's computer.

The network shell module of the present invention provides a view of the on-line network as a group of folders similar to the group of folders which represent the user's local file system. This generalized folder approach provides a user with a consistent mechanism which allows browsing for folders located in his local computer or browsing for folders located on the on-line network. Users thus interact with the network shell module in a natural way because the on-line network simply appears as an extension of the user's local file system.

The editor modules in the present invention provide a group of standardized modules, preferably one for each service, which include data, pointers and software instructions needed to control the content entities in a service. In addition, the editor modules provide an intuitive and easy-to-use user interface which allows end-users and third party content providers to edit the content of the on-line network in a natural manner.

Another feature of the present invention allows the editor modules to edit content entities in a distributed on-line network independent of the specific hardware implementation. For example, the content management of conventional distributed on-line networks such as the internet, correspond to the management of specific hardware components within the on-line network. A third-party provider on the Internet typically connects its own computer system to the Internet. The third-party provider then retains system operator responsibility for managing the content within its own computer system.

Thus, current distributed on-line networks do not grant system operator rights which are independent of the hardware implementation. With the hardware independent implementation of the present invention, an on-line network provider can assign third-party providers to subsections in the on-line network regardless of where the subsection resides in the on-line network hardware. Accordingly, the third-party provider can manage and organize the content within its assigned subsection independent of the hardware components within the on-line network.

For example, as discussed in further detail below, the on-line network may advantageously store the content entities associated with a particular service on different computers than the content entities associated with another service. With the editing system of the present invention, an on-line service provider can assign a third-party provider responsibility for subsections of both services. The third-party provider can then use the editor modules to add content entities to both services, supply content, create new categories, link the content entities in different services, etc. Thus, the hardware implementation of the on-line network does not constrain the third-party system operators.

Another feature of the present editing system allows the creation of specialized editor modules for particular services in the on-line network. These specialized editor modules are then distributed to those end-users and third-party providers that have system operator access rights. For example, a service provider can create a new service and a specialized editor module associated with the new service. The specialized editor module allows third-party content providers and end-users to edit the content entities existing in the new service.

The use of multiple editor modules substantially reduces the costs associated with having to maintain a single editor module for the entire on-line network. Instead of requiring the network provider to develop or modify an editor module each time a new service is added to the on-line network, each service provider simply provides a specialized editor module which is customized for the new service.

A still further feature of the present invention automatically identifies and invokes the proper editor module associated with a selected content entity. In the preferred embodiment, each content entity contains an application identifier (APPID) which identifies the editor module designed for the service which contains the content entity. When a third-party provider selects a content entity, the editing system uses the content entity's application identifier to identify and invoke the proper editor module. This greatly simplifies the multiple editor module implementation of the present invention by automatically identifying and invoking the proper editor module when a system operator enters his assigned area of responsibility.

BRIEF DESCRIPTION OF THE DRAWINGS

These and other aspects, advantages, and novel features of the invention will become apparent upon reading the following detailed description and upon reference to accompanying drawings in which:

FIG. 8A illustrates a node editor table used by a preferred embodiment of the present invention;

FIG. 8B illustrates a new node information table used by a preferred embodiment of the present invention;

FIGS. 18A–18B are diagrams illustrating property sheets associated with a node in the on-line network;

Figure 1:
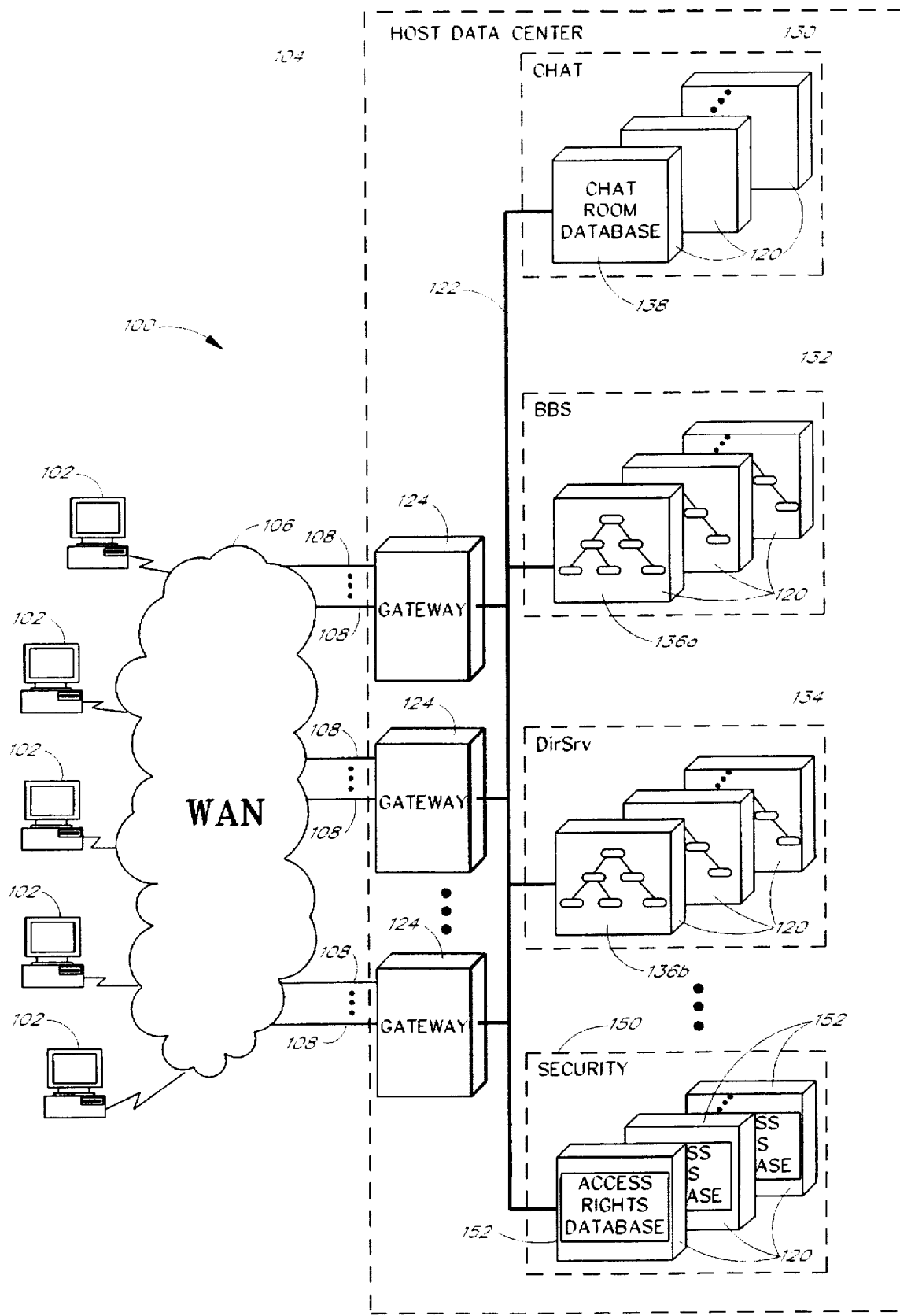
FIG. 1 is a high level drawing illustrating the architecture of an on-line services network.

In the drawings, the first digit of any three-digit number indicates the number of the figure in which the element first appears. For example, an element with the reference number 402 first appears in FIG. 4. Where four-digit reference numbers are used, the first two digits indicate the figure number.

DETAILED DESCRIPTION OF THE PREFERRED EMBODIMENTS

The detailed description which follows is broken up into the following sections: ARCHITECTURAL OVERVIEW OF AN ON-LINE SYSTEM APPROPRIATE FOR USE WITH THE EDITING SYSTEM, ORGANIZATION OF THE ON-LINE NETWORK CONTENT, and THE EDITING SYSTEM.

1. Architectural Overview Of An On-line System Appropriate For Use With The Editing System This section provides an overview of the on-line services network in which the present invention is employed. The architecture of this network is further described in commonly-assigned copending U.S. application Ser. No. 08/472,807, having the title ARCHITECTURE FOR SCALABLE ON-LINE SERVICES NETWORK, filed Jun. 7, 1995 which is hereby incorporated herein by reference.

FIG. 1 is a high level drawing illustrating the architecture of an on-line network 100 appropriate for use with the editing system of the editing system of the present invention. The on-line network 100 includes multiple local computers 102 connected to a host data center 104 by one or more wide area networks (WANs) 106. The wide area network 106 of the preferred embodiment includes wide area network (WAN) lines 108 which are provided by one or more telecommunications providers. The wide area network 106 allows end-users of the local computers 102, dispersed over a wide geographic area, to access the host data center 104 via a modem.

The host data center 104 comprises a plurality of servers 120 connected to a high speed local area network (LAN) 122. Also connected to the local area network 122 are multiple Gateways 124 linking incoming calls from end-users to the servers 120. In the preferred embodiment, the servers 120 and the Gateways 124 are Pentium-class (or better) microcomputers which run the Windows NT operating system available from Microsoft Corporation.

The servers 120 typically have at least 128 MB of random-access memory (RAM) and at least 4 GB of disk space. Processing power may vary from server 120 to server 120. For example, one server 120 may have four 100 Mhz processors, while another server 120 may have one 90 Mhz processor. Each Gateway 124 typically has at least 64 MB of RAM and at least 2 GB of disk space, and is capable of supporting approximately 1000 simultaneous end-users at T1 (1.544 Mbps) or greater data rates. The local area network 122 is preferably a 100 Mbps LAN based on the CDDI (Copper Distributed Data Interface) standard. The CDDI specification is a variant of the well-known ANSI Fiber Distributed Data Interface specification, but uses a single copper ring instead of a dual fiber ring.

Various other types of servers 120 and other microcomputers are connected to the LAN 122 but are not shown in FIG. 1. For example, billing and logon servers 120 are provided to record billable events and to handle user logons. Further, arbiter microcomputers are provided to perform transaction replication services for certain service groups, allowing the application servers 120 of such service groups to store identical copies of the same service content data.

During a typical logon session, an end-user subscriber maintains a communications link with a single Gateway 124, but may access multiple service applications (and thus communicate with multiple servers 120). The Gateway 124 performs protocol translation, translating messages between the protocol of the wide area network 106 and the protocol of the local area network 122 and establishes links between a local computer 102 and a particular server 120.

The host data center 104 provides a variety of communications-based and information-based on-line services to end-users. Typical services include, for example, a chat service 130, a bulletin board service 132, a DirSrv service 134, a security service 150 and other services not shown such as an electronic mail service, a media view service, an interactive game service and various news services.

The DirSrv service 134 provides the main catalog of the on-line network content. The bulletin board service 132 (BBS) allows end-users to post and review bulletins on specific topics and also provides a hierarchical data structure of the bulletin board service 132 content. With the bulletin board service 132, end-users conduct non-real-time conversations by posting messages to different bulletin boards. The chat service 130 contains a chat room database 138 that allow end-users to communicate in real time with one another in chat rooms. Typically, the chat rooms are dedicated to specific topics.

The services offered to end-users of the on-line network 100 are in the form of client-server application programs. The client applications execute on the end-users' local computers 102 while the service applications execute on one or more of the servers 120. In the presently preferred embodiment, the client applications are implemented as Win 95 executables and the server portions are implemented as dynamic link libraries which execute under the Microsoft Windows NT operating system.

In one embodiment, the on-line network 100 does not offer the security service 150 directly to end-users of the on-line network 100. Instead, the security service 150 communicates with other services to provide access rights data. The security service 150 maintains an access rights database 152 which contains the access rights data for all end-users of the network 100. Each security service 150 runs Structured Query Language (SQL) code to provide access to its respective access rights database 152. The structured query language is a language standardized by the International Standards Organization (ISO) for defining, updating and querying relational databases. A query to the access rights database 152 can emanate either from one of the other service applications (when, for example, an end-user attempts to access a node which is stored by the service application), or by one of the Gateways 124 (when an end-user attempts to open an on-line service). A preferred implementation of the security service 150 is described in a concurrently filed application having the title SYSTEM AND METHOD FOR CONTROLLING ACCESS TO DATA ENTITIES IN A COMPUTER NETWORK, which is hereby incorporated herein by reference.

2. Organization Of The On-line Network Content

As illustrated in FIG. 1, the on-line network 100 contains hierarchically organized services and non-hierarchically organized services. For example, the DirSrv service 134 and the bulletin board service 132 contains a hierarchical data structure (also called a service namespace) 136 similar to a hierarchical tree. Each item in the hierarchical data structure 136 is referred to as a "node." In the preferred embodiment, the service namespaces 136 are acyclic graphs which allow the linking of nodes on one branch of a service namespace 136 to reference nodes on other branches of the same service namespace or to reference nodes on the branches of other service namespaces 136.

As explained in more detail below, the DirSrv namespace 136b provides the main catalog of the on-line network content. The top level of the DirSrv namespace 136b organizes the on-line content into general classifications while each successive layer defines more detailed subcategories. The bulletin board service namespace 136a organizes the bulletin boards into different classifications and also organizes the messages posted in each bulletin board.

Not all services, however, organize information hierarchically. For example, the chat rooms within the Chat service 130 are not organized into a hierarchical data structure. Because chat rooms provide live conversations, a hierarchical data structure isn't needed to organize messages since the chat rooms post the messages in the sequence in which they are received. The chat room database 138 keeps a list of each chat room in the chat service 130 and provides access to the chat rooms.

End-users of the on-line network 100, however, still need the ability to locate and access the offerings within the non-hierarchical services. For example, an end-user needs the ability to locate and access a particular chat room in an intuitive and organized manner. As explained in more detail below, the offerings in the nonhierarchical services are represented as nodes in the main catalog of the DirSrv namespace 136b.

For example, in the on-line network 100, chat rooms are represented as nodes in the DirSrv namespace 136b. An end-user can browse the DirSrv namespace 136b and locate a desired chat room node. When the end-user selects a chat room node, the end-user accesses the desired chat room in the chat service 130.

Figure 2:
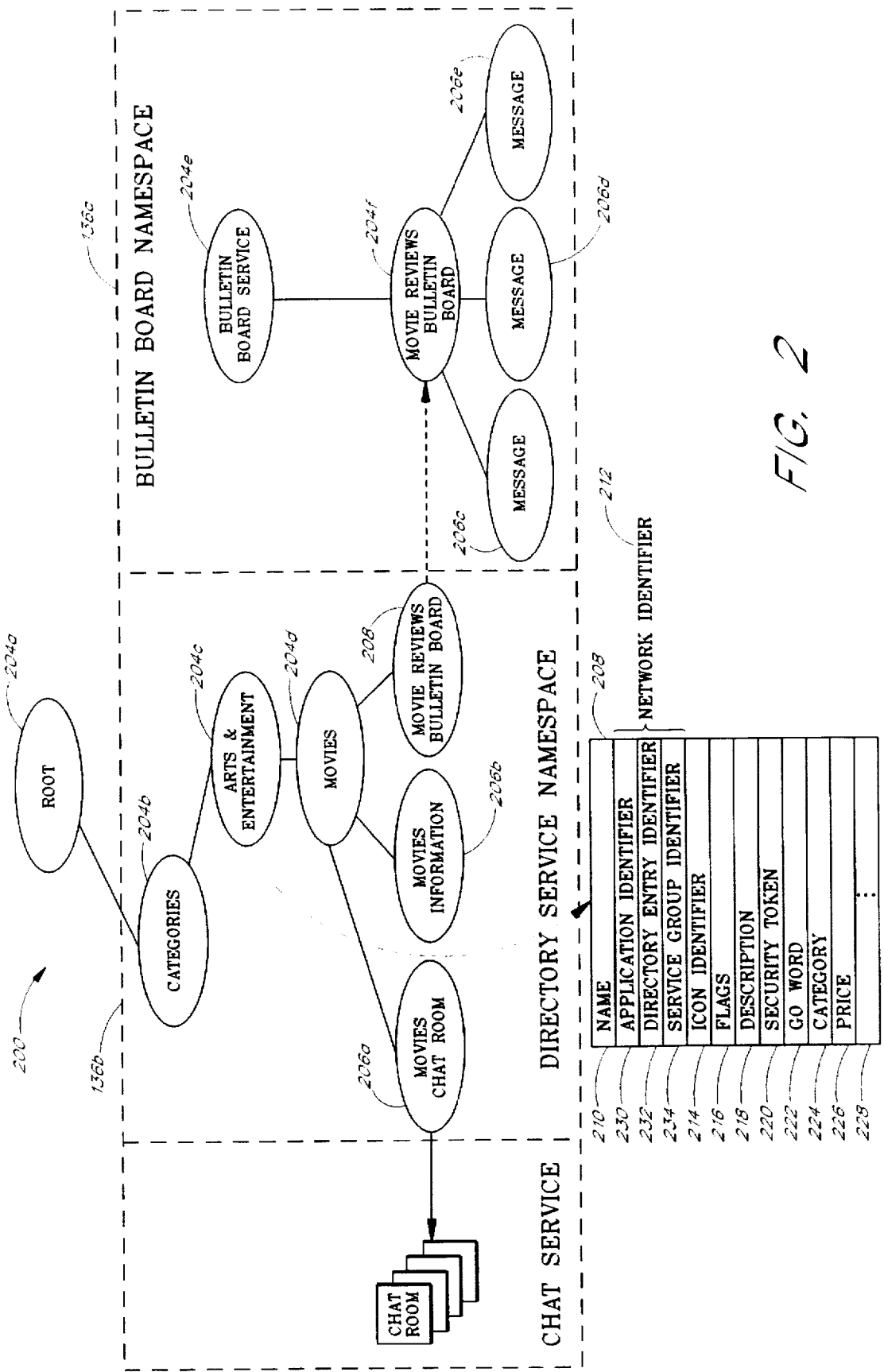
FIG. 2 is a block diagram illustrating one embodiment of the hierarchical data structure that advantageously exists in the on-line network accessed by the present invention.

As illustrated in FIG. 2, the entire hierarchical data structure 200 of the on-line network 100 acts as a network abstraction layer which hides the hardware-dependent details such as the gateways 124 and the servers 120 which comprise the on-line network 100. The entire hierarchical data structure 200 includes three different types of nodes-folder nodes 204, leaf nodes 206 and junction point nodes 208. Folder nodes 204 contain other nodes. Leaf nodes 206 contain non-hierarchical information such as executable programs, data files, messages, etc. Junction point nodes 208 link one service namespace with another service namespace.

In one embodiment, the on-line network 100 includes a root folder node 204a, the bulletin board service namespace 136a and the DirSrv namespace 136b. The DirSrv namespace 136b provides the hierarchical tree structure for the content existing within the DirSrv service 134. Likewise, the bulletin board service namespace 136a provides the hierarchical data structure for the content existing within the bulletin board service 132.

For example, the DirSrv namespace 136b organizes the information content of the on-line network 100 with folder nodes 204. As shown in FIG. 2, the DirSrv namespace 136b contains a "categories" folder node 204b. The "categories" folder node 204b contains an "arts and entertainment" folder node 204c. The "arts and entertainment" folder node 204c further contains a "movies" folder node 204d. The DirSrv namespace 136b in one embodiment of the on-line network represents non-hierarchical services as leaf nodes 206. In addition, programs, documents and images are also represented as leaf nodes. In this example, the movies folder node 204d contains a movies chat room leaf node 206a, a movies information leaf node 206b and a movie reviews junction point node 208.

The DirSrv namespace 136b is linked to the bulletin board service namespace 136a via the movie reviews junction point node 208. As explained above, junction point nodes 208 link one service namespace 136 with another service namespace 136. In this example, the movie reviews junction point node 208 in the DirSrv namespace 136b references the movie reviews bulletin board node 204f. Thus, an end-user accessing information about movies in the DirSrv namespace 136b can easily access a bulletin board which discusses new movie releases.

The bulletin board service 132 allows end-users to post and review messages on different bulletin boards. In this example, bulletin boards and groups of related bulletin boards are contained by folder nodes 204. The bulletin board service namespace 136a illustrated in FIG. 2 contains a top level bulletin board service folder node 204e and a movie reviews bulletin board node 204f. In the bulletin board service namespace 136a, leaf nodes 206 represent different bulletin messages. In this example, the movie reviews bulletin board node 204f contains three messages which are represented as three leaf nodes 206c, 206d and 206e.

In the preferred embodiment, each node contains a set of node properties 208. The set of node properties 208 contains the node's name 210, a network identifier 212, an icon identifier 214, flags 216, a description 218, a security token 220, a go word 222, a category 224, a price 226 and other items 228. The node's name 210 is a human readable name such as the "movies" name in the movies folder node 204d.

TABLE 1

| APPLICATION IDENTIFIER | DEFINED MEANING |
| --- | --- |
| 0x0001H | DirSrv Namespace |
| 0x0002H | Bulletin Board Service Namespace |
| 0x0003H | Root Node |
| 0x0004H | Chat Room |
| 0x0006H | Media Viewer |
| 0x0007H | Download and Run |
| 0x000BH | Encarta |
| 0x000CH | Book Shelf |

The network identifier 212 is a 112-bit number which comprises an application identifier 230, a directory entry identifier 232 and a data set identifier 234. The application identifier 230 is a 32-bit number which identifies a particular service namespace 136. Thus, in the preferred embodiment of the present invention, the application identifier 230 uniquely identifies up to approximately four billion ($2^{32}$) service namespaces 136.

Currently, eight application identifiers 230 identify the different namespaces. Table 1 describes the defined meaning of the eight application identifiers 230 in the preferred embodiment. The value of the eight application identifiers are shown in a hexadecimal format. As the on-line network grows, it is envisioned that the on-line network provider will define additional application identifiers 230.

The directory entry identifier 232 is a 64-bit number which uniquely identifies each node in a particular service namespace 136. The directory entry identifier 232 of the present invention advantageously identifies up to approximately 18 billion, billion ($2^{64}$) nodes within a service namespace 136. The data set identifier 234 is a 16-bit number which advantageously identifies a group of servers 120.

The icon identifier 214 identifies the icon image or bit-map associated with a node. The flags 216 identify whether the node is a folder node 204, a leaf node 206 or a junction point node 208. The description 218 is a variable length field. In the preferred embodiment, the description 218 is not constrained to a particular size. Typically, the description 218 provides a summary of the offering associated with the node. The security token 220 is a 4-byte value which identifies a node's access rights. When an end-user attempts to access a node, the node's security token 220 and the end-user's 32-bit account number are used to determine the end-user's access rights with respect to the node. (For junction point nodes 208, the security token 220 of the referenced node is used).

The security tokens 220 are preferably stored by the DirSrv service 134 as node properties. In the preferred implementation of the on-line network 100, the on-line network provider defines the security tokens 220 as needed, and stores the security tokens 220 as node properties 208. For example, the nodes of a service namespace 136 can either be assigned their own security token 220 (to allow separate security for the area), or can use an existing security token 220, such as the security token 220 of the node's parent node. The present invention uses the security tokens 220 to determine whether an end-user or third-party content provider has system operator privileges to edit a node.

The go word 222 uniquely identifies a service in the on-line network 100. The price 226 defines the costs for accessing the content contained in a node. The other items 228 include other properties which a service provider can define. Thus, besides providing the set of properties 208 listed above, the present invention allows service providers to create their own node properties.

3. The Editing System

The service namespaces 136 will become enormous hierarchical data structures. In order to cost effectively manage and supervise the service namespaces 136, the present invention provides a simple, intuitive and flexible editing system which allows system operators to create, organize, delete and modify the nodes within their assigned areas in the on-line network 100.

a. The Editing System Architecture

Figure 3:
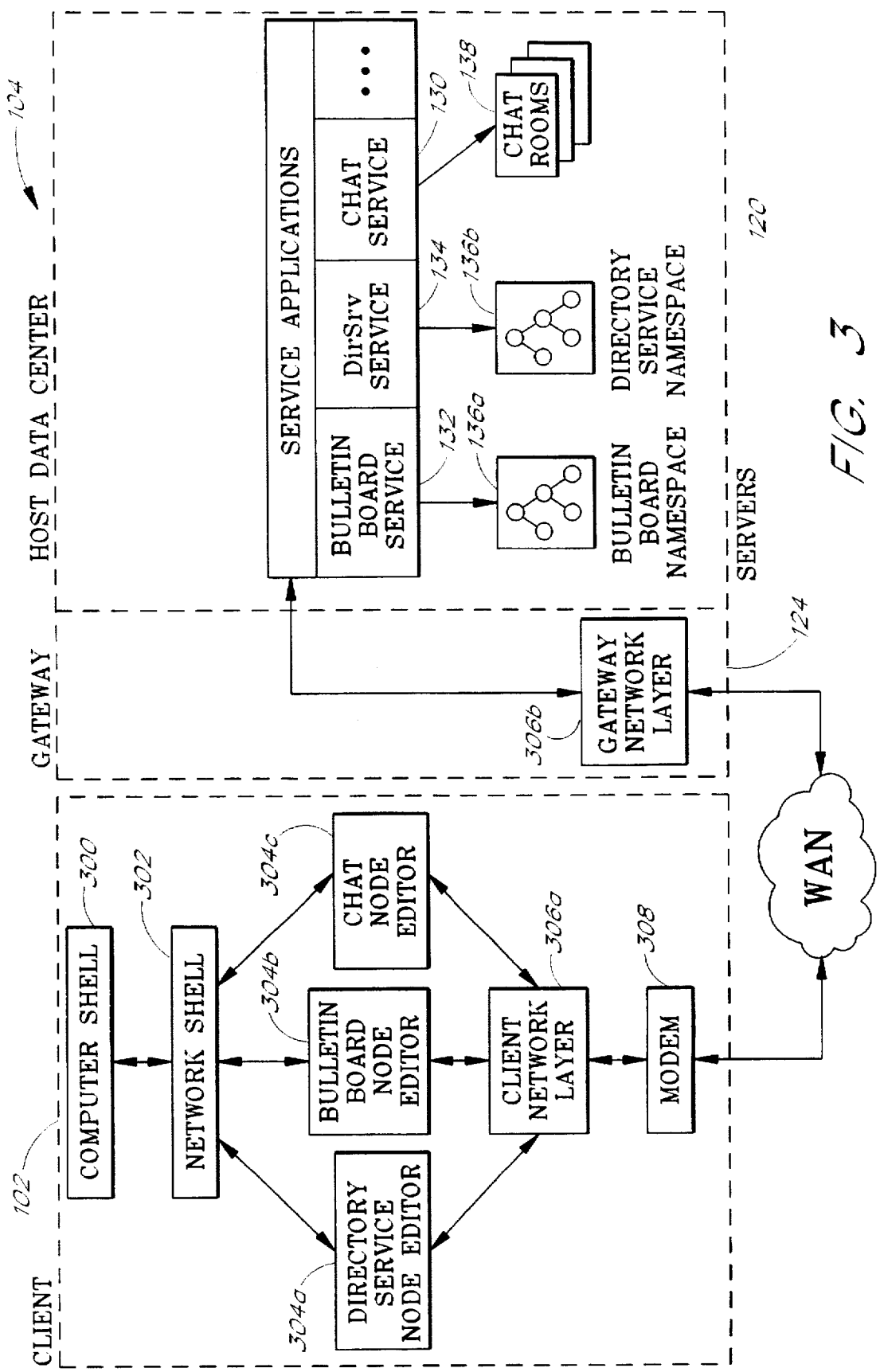
FIG. 3 is a high-level block diagram illustrating the architecture of a preferred embodiment of the present invention.

FIG. 3 illustrates a block diagram of the editing system in a preferred embodiment of the present invention. The present invention generally contains multiple modular components including a computer shell module 300, a network shell module 302, and one or more node editor modules 304 which communicate with server applications on the on-line network 100. In this example, the server applications include the bulletin board service 132, the DirSrv service 134 and the chat service 130. As explained in more detail below, these modules interact to provide a flexible and extensible system for editing content in the on-line network 100.

In the present invention, a network layer 306 in the local computer 102 manages the communications between the client portion of the editing system and the server applications. The client network layer 306a in the local computer 102 communicates via a modem 308 over the wide area network 106 with the host data center 104. A gateway network layer 306b exists on each gateway 124 which interfaces with the wide area network 106 and establishes communication links with desired server applications via the local area network 122. A person skilled in the art can appreciate that the client network layer 306a and the gateway network layer 306b can be implemented using any number of different protocols and computer configurations without departing from the scope of the present invention.

Focusing now on the modular components in the client application of the present invention, the computer shell module 300 (hereinafter referred to as the computer shell 300) creates a visual display (also called a user interface) which allows the end-user to direct his local computer 102 to perform a desired action. The software which implements a user interface is called a shell. Thus, the computer shell 300 is the set of software instructions which (1) create the visual display and (2) process the end-user's input commands on the local computer 102. For example, the end-user can use the computer shell 300 to direct his local computer 102 to locate files, invoke programs and the like. In the preferred embodiment, the computer shell 300 is the Microsoft Win 95 Explorer.

As described in more detail below, the end-user can select the on-line network 100 from within the computer shell 300.

In the present invention, when the end-user selects the on-line network 100, the computer shell 300 contains a globally unique identifier that identifies the on-line network 100. The computer shell 300 sends the globally unique identifier to an Object Linking and Embedding module (not shown) which invokes the network shell 302 module 302. The Object Linking and Embedding module Version 2.0 is defined by Microsoft Corporation and is well known in the art and is further described in OLE 2 Programmer's Reference Vol. I, Microsoft Press, 1993, OLE 2 Programmer's Reference Vol. II, Microsoft Press, 1993 and Brockschmidt, Inside OLE 2, Microsoft Press, 1994 which are hereby incorporated herein by reference. In response to the on-line network globally unique identifier, the Object Linking and Embedding module invokes the network shell module 302.

The network shell module 302 (hereinafter referred to as the network shell 302) 30 controls the communications among the computer shell 300 and one or more node editor modules 304. As explained in more detail below, the network shell 302 preferably exists in a dynamic link library and provide the user interfaces which allow the end-user to browse the on-line network 100. In addition, the network shell 302 converts nodal data received from the on-line network 100 into a format recognizable by the computer shell 300. Furthermore, the network shell 302 locates and invokes executable programs when the end-user selects a leaf node in the on-line network 100. An embodiment of the network shell is described in a commonly-assigned copending U.S. Application entitled ON-LINE NETWORK ACCESS SYSTEM, filed Jul. 17, 1995, which is hereby incorporated herein by reference.

Figure 4:
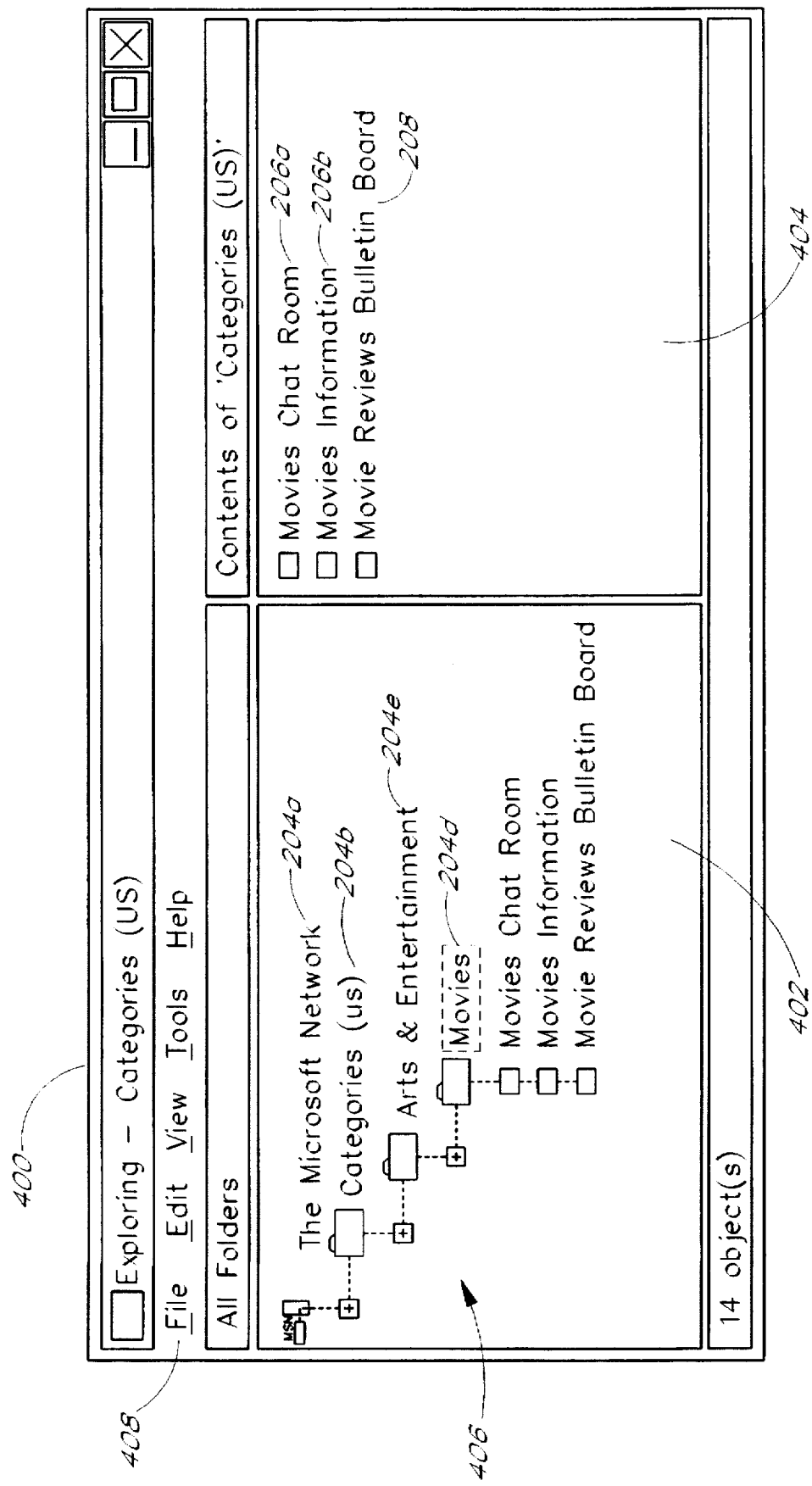
FIG. 4 is a diagram illustrating the graphical user interface created by the network shell of the preferred embodiment.

The network shell 302 and the computer shell 300 interact to provide a consistent user interface. Thus, the end-user can input similar commands and see similar icons when the end-user is browsing the file structure in his local computer 102 or when the end-user is browsing the content located in the on-line network 100. In one embodiment, as illustrated in FIG. 4, the computer shell 300 creates a two-pane window 400. The network shell 302 then obtains the on-line nodal information necessary to present a hierarchial view of the on-line network 100 in the left pane 402 and the contents of a selected folder node 204 in the right pane 404. For example, the left pane 402 indicates that the end-user has selected the movies folder node 204d (the folder node is highlighted in the left pane 402). In the right pane 404, the network shell 302 displays the contents of the movies folder node 204d.

The left pane 402 contains a hierarchical content map 406 of the end-user's location in the on-line network 100. In this example, the left pane 402 shows that the root folder node 204a in the on-line network 100 contains a categories folder node 204b, the categories folder node 204b contains an arts and entertainment folder node 204e and the arts and entertainment folder node 204e contains a movies folder node 204d. The right pane 404 shows that the contents of the movies folder node 204d includes the movies chat room leaf node 206a, the movies information leaf node 206b and the movie reviews bulletin board junction point node 208.

As illustrated in FIG. 3, the next module of the present invention includes one or more node editor modules 304 (hereinafter referred to as node editors 304). In the presently preferred embodiment, the on-line network 100 editing system contains a node editor 304 for the hierarchical structure of nodes in each service namespace 136. For example, in the presently preferred embodiment, a node editor 304a exists for the DirSrv namespace 136b, a node editor 304b exists for the bulletin board service namespace 136a and a node editor 304c exists for the chat service.

A node editor 304 is the software which (1) provides a user interface for node editing functions and (2) communicates with a service application to create, delete, edit, link and unlink nodes within a service namespace 136. Thus, a node editor 304 is the software which displays system operator menus related to editing functions and performs the editing functions specified by the system operator.

For example, the menu 408 in FIG. 4 includes headings such as File, Edit, View, Tools and Help. When the end-user selects the File heading, the system operator menu illustrated in FIG. 5 appears. The File menu includes commands such as a File/Open command 500, a File/Properties command 506, a File/Close command 508, etc. Every end-user of the on-line system sees this File menu format. However, if the end-user has system operator access rights the File menu includes a File/New command 502 and a File/Delete command 504. Thus, when the end-user enters a subsection of a namespace 136 where the end-user has system operator privileges, the File menu displays the File/New command 502 and the File/Delete command 504. Preferably, the system operator menu 510 is in a cascading format, so that when an end-user selects the File/New command 502, a system operator menu 510 appears that shows the types of nodes a system operator can create.

Different node types are created, modified, deleted, linked and unlinked with different node editors 304. The use of different node editors 304 allows a service provider to customize a particular node editor 304 for the type of nodes provided in that service application's namespace 136. Thus, when an end-user with system operator privileges accesses the DirSrv namespace 136b, the present invention automatically invokes the DirSrv node editor 304a. Likewise, when an end-user with system operator privileges accesses the bulletin board service namespace 136a the present invention automatically invokes the bulletin board node editor 304b.

In addition, it is contemplated that future service providers may wish to provide custom nodes with custom node editors 304 for their assigned service namespaces 202. For example, suppose an interactive game provider desires to provide an interactive game service on the on-line network 100. In this example, the on-line network 100 assigns an application identifier 230, and a new service namespace 136 to the interactive game provider. The game service provider can then provide a new, customized node editor 304 that allows system operators to edit nodes in the games namespace. With the present invention, the new node editor 304 is automatically invoked when the system operators enter their assigned subsections of the interactive games service namespace.

As a result, the present invention frees the on-line network provider from having to maintain a single node editor 304 which accommodates the different types of nodes which new services providers may create. This substantially reduces the costs associated with having to maintain a node editor 304 for the entire on-line network 100. Each service provider simply provides a node editor 304 which is customized for that service provider's namespace 136. The present invention also simplifies this multiple node editor 304 implementation by automatically identifying and invoking the proper node editor 304 when a system operator enters his assigned area of responsibility.

Figure 6:
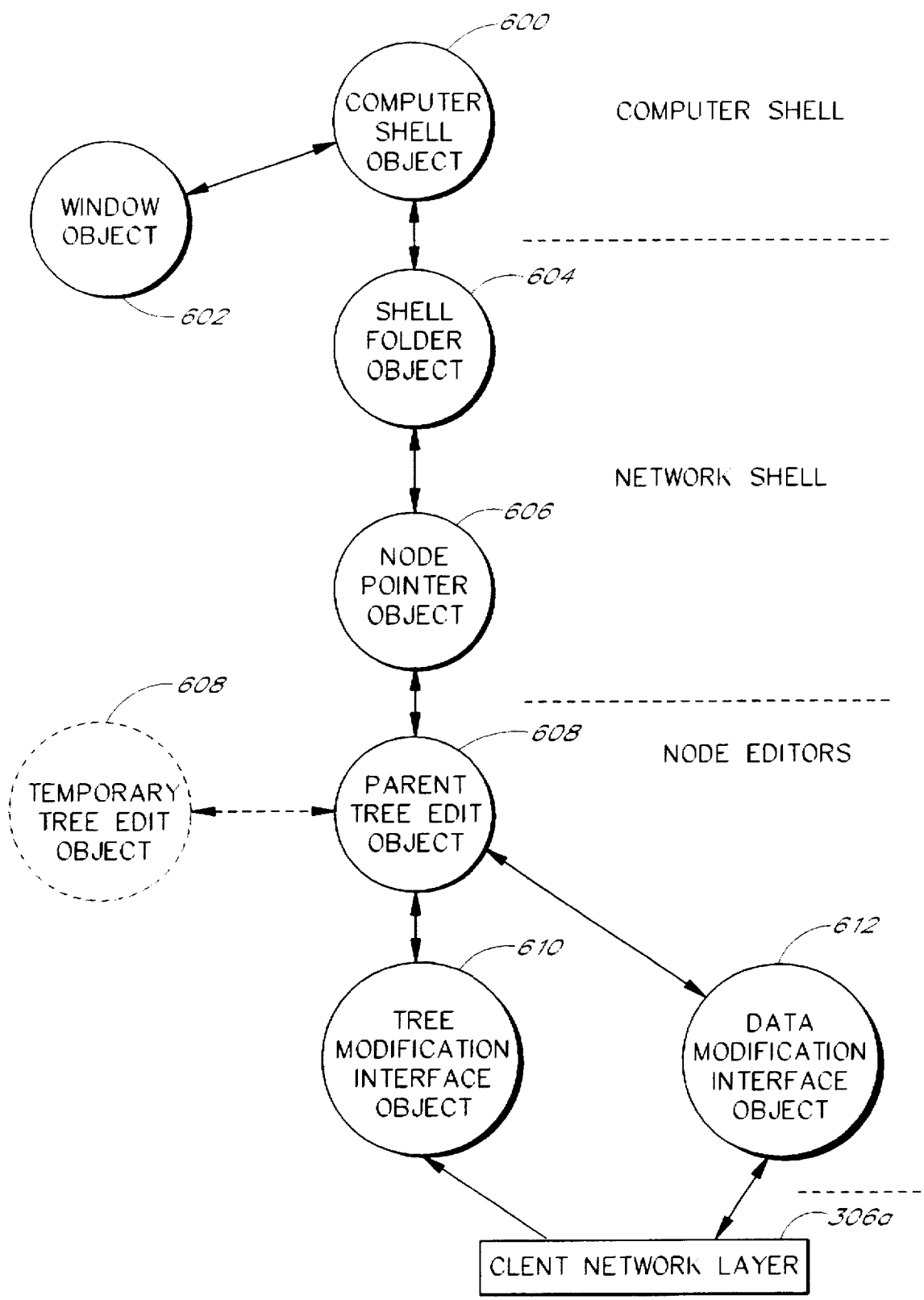
FIG. 6 is a block diagram of the data structure created and used by a preferred embodiment of the present invention.

Referring now to FIG. 6, the data structure created by the node editing system of the preferred embodiment is shown. The data structure exists in the memory of the local computer 102 and includes a computer shell object 600, a window object 602, a shell folder object 604, a node pointer object 606, a parent tree edit object 608, a temporary tree edit object 608, a tree modification interface object 610, a data modification interface object 612 and the client network layer 306a. While the following description describes the present invention in object-oriented terminology, a person of ordinary skill in the art will appreciate that other programming techniques can be used such as defined structures, arrays, procedure calls and subroutines.

In the present invention, an object is a data structure which contains data and a set of accompanying functions which manipulate the data. A function (also called a method) is a set of programmed instructions which direct the computer hardware to perform a desired action. When an object is created it is said to be instantiated. The instantiation of an object includes the allocation of memory in the local computer 102 to hold the object and the creation of object interfaces which point to functions implemented by the object. An object interface groups the functions contained in an object. Typically, an object interface is a table which points to the functions within the object. The object interface allows other objects to "call" the functions existing within the object. This typically takes the form of a function call which specifies a particular interface and function name. The function call also passes data to the object containing the function. The functions which exist in an object are often called application programming interfaces or API's.

It should be understood that FIG. 6 only illustrates a snapshot of the data structure at a particular point in time. Thus, FIG. 6 illustrates the data structure when a system operator is using the editing system to create a new node. As the end-user creates new nodes, deletes nodes, modifies nodes, links nodes or unlinks nodes in the on-line network 100, the data structure in FIG. 6 expands to contain additional window objects 602, shell folder objects 604, node pointer objects 606, parent tree edit objects 608, temporary tree edit objects 608, tree modification interface objects 610 and data modification interface objects 612.

In the preferred embodiment of the present invention, the computer shell 300 is represented by the computer shell object 600 and the window object 602. The computer shell object 600 and the window object 602 contain the data and functions which implement the computer shell 300. In the preferred embodiment, the Win 95 Explorer creates the computer shell object 600 and the window object 602. The computer shell object 600 and window object 602 interact to process input commands and create the windows 400 displayed on the end-user's local computer 102.

The network shell 302 extends the Win 95 Explorer so that it can access the on-line network 100. As explained in more detail below, the Win 95 Explorer has been modified to include the network identifier 212 of the root folder node 204a, and the software instructions which call the network shell 302 functions. The network shell 302 is represented by the shell folder object 604 and the node pointer object 606. In the preferred embodiment, the shell folder object 604 is called the ShellFolder object. The IShellFolder acronym stands for an "Interface of the Shell Folder object" and is hereinafter referred to as the shell folder object 604. The present invention creates a new shell folder object 604 each time the end-user views a new folder node in the on-line network 100.

Each node pointer object 606 points to a particular node on the on-line network 100. The present invention creates a node pointer object 606 each time the end-user accesses a new node in the on-line network 100. For example, when an end-user selects the categories node 204b, the present invention creates a node pointer object 606 in the end-user's local computer 102 that references the categories node 204b in the on-line network 100. A person skilled in the art can appreciate that the computer shell 300 and the network shell 302 can be implemented using any number of different programming techniques which reference the nodes in the on-line network 100 without departing from the scope of the present invention.

If the end-user selects a node within a hierarchical service namespace 136 in which the end-user has system operator access rights, the present invention creates the tree edit object 608 which contains the node editor 304 associated with the selected node. Thus, each tree edit object 608 corresponds to a particular node for which the user has system operator access rights. For example, FIG. 6 illustrates a parent tree edit object 608 and a temporary tree edit object 608 which are instantiated when the end-user desires to create a new node in the on-line network 100. As explained in more detail below, the parent tree edit object 608 corresponds to an existing node and the temporary tree edit object 608 corresponds to a newly created node. Both the parent tree edit object 608 and the temporary tree edit object 608, however, are generally referred to as tree edit objects 608.

For example, if the end-user selects a node in the DirSrv namespace 136b, the present invention creates a node pointer object 606 which points to the selected node. If the end-user has system operator access rights for the selected node, the present invention also creates a parent tree edit object 608 which points to the node editing functions for the selected node. The parent tree edit object 608 and the node pointer object 606 then communicate with each other.

If the end-user wishes to create a new node which depends from the selected node (a child node), the present invention creates the temporary tree edit object 608. The temporary tree edit object 608 contains the node editor 304 for the general type of node the end-user desires to create (i.e. DirSrv node, bulletin board node, chat room, etc.). In the preferred embodiment, the temporary tree edit object 608 and the parent tree edit object 608 communicate with each other.

The tree modification interface object 610 communicates with the service applications that contain hierarchically organized service namespaces 136. In the preferred embodiment, the tree modification interface object 610 sends editing commands to the hierarchically organized service applications that direct the service applications to create, modify, delete, link and unlink nodes within the hierarchical service namespaces 136. For example, the tree modification interface object 610 communicates with the DirSrv service 134 and the bulletin board service 132 in order to create, modify, delete, link and unlink the hierarchically organized nodes within those service namespaces 136.

The data modification interface object 612 communicates with non-hierarchically organized service applications. In the preferred embodiment, the data modification interface object 612 sends editing commands to the non-hierarchical service applications that direct the service applications to create, modify and delete offerings within the non-hierarchical services. For example, the data modification interface object 612 communicates with the non-hierarchical chat service 130 to create, modify and delete chat rooms within the chat service 130.

Figure 7A:
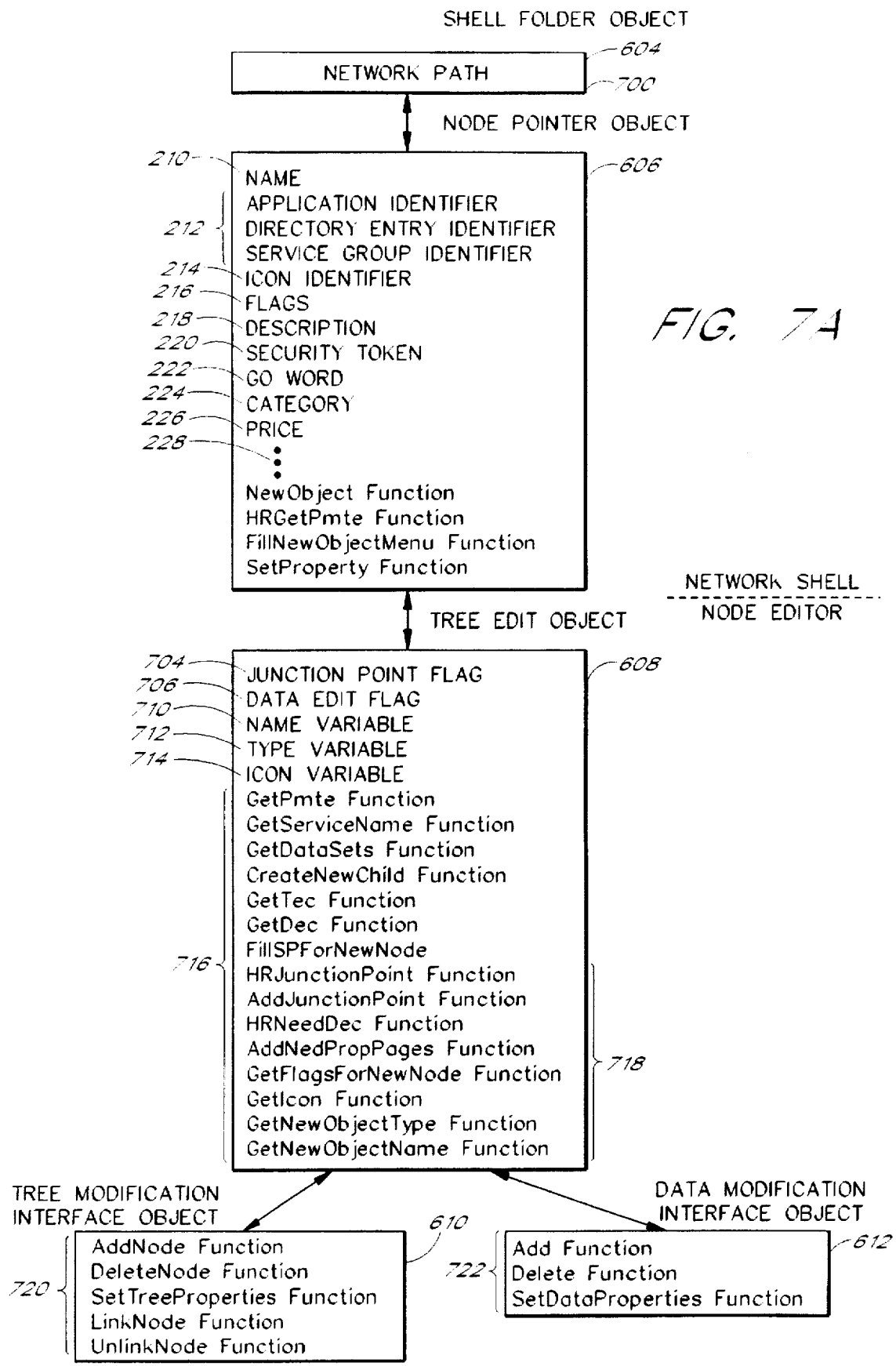
FIG. 7A is a detailed block diagram of a shell folder object, a node pointer object, a tree edit object, a tree modification interface object and a data modification interface object of a preferred embodiment of the present invention.

Referring to FIG. 7, a detailed block diagram of the shell folder object 604, the node pointer object 606, the tree edit object 608, the tree modification interface object 610 and the data modification interface object 612 is shown. Each shell folder object 604 corresponds to a folder node and contains a network path 700 and a set of network shell functions (not shown). The network path 700, as described in more detail below, contains the path of nodes to a particular location in the on-line network 100. For each node in the network path 700, the present invention stores a length header which identifies the length of a node's network identifier 212, the value of a node's network identifier 212 and a validator. In the preferred embodiment, the validator indicates that the data structure relates to a node on the on-line network 100. In the preferred embodiment, the validator is assigned the decimal number 112,393. The end of the network path 700 is signaled by a null data segment which is set to zero. The network shell functions (not shown) include functions for creating node pointer objects 606 and functions for displaying user interfaces associated with the selected folder nodes.

Each node pointer object 606 references a node on the on-line network 100. Furthermore, each node pointer object 606 contains the set of node properties 208 for the referenced on-line node. Therefore, the node pointer object 606 contains the node's name 210, the network identifier 212, icon identifier 214, flags 216, the description 218, security token 220, go word 222, category 224, price 226, other items 228 and a set of node pointer functions 702. As described above, the node's name 210 is a human readable name which may be displayed with the node's corresponding icon such as the "movies" name in the movies folder node 204d. The network identifier 212 is a 112-bit number which comprises an application identifier 230, a directory entry identifier 232 and a data set identifier 234. The icon identifier 214 identifies the icon image or bit-map associated with the node. The flags 216 identify whether the node is a folder node 204, a leaf node 206 or a junction point node 208.

The security token 220 is a 4-byte value which identifies the access rights associated with a node. When the end-user attempts to access a node, the node's security token 220 and the end-user's 32-bit account number are used to determine the end-user's access rights with respect to that node. (For junction point nodes 208, the security token 220 of the referenced node is used).

The go word 222 uniquely identifies a service in the on-line network 100. The price 226 defines the costs for accessing the content contained in a node. The other items 228 include other properties which a service provider can define. The node pointer object 606 also contains a set of node pointer functions 702 that include the NewObject function and a HRGetPmte Function that interact to create tree edit objects 608, a FillNewObjectMenu function for displaying the system operator menu 510 and a SetProperty Function for modifying a node's properties.

Each tree edit object 608 has a junction point flag 704, a data edit flag 706, a name variable 710, a type variable 712, an icon variable 714 and a set of node editing functions 716. In the present invention, the set of node editing functions 716 is implemented as a set of default node editing functions 716. However, as new nodes types and new node editors 304 are created, the set of default node editing functions 716 can be replaced by a set of customized node editing functions 718. The customized node editing functions retain the same names but implement different software instructions.

The default node editing functions required to enable the present invention include: a GetPmte function, a GetServiceName function, a GetDataSets function, a CreateNewChild function, a GetTec function, a GetDec function, a FillSPForNewNode function, a HRJunctionPoint function, an AddJunctionPoint function, a HRNeedDec function, an AddNedPropPages function, a GetFlagsForNewNode function, a GetIcon function, a GetNewObjectName function and a GetNewObjectType function. The customizable node editing functions include: the HRJunctionPoint function, the AddJunctionPoint function, the HRNeedDec function, the AddNedPropPages function, GetFlagsForNewNode function, the GetIcon function and the GetNewObjectType function.

Figure 7B:
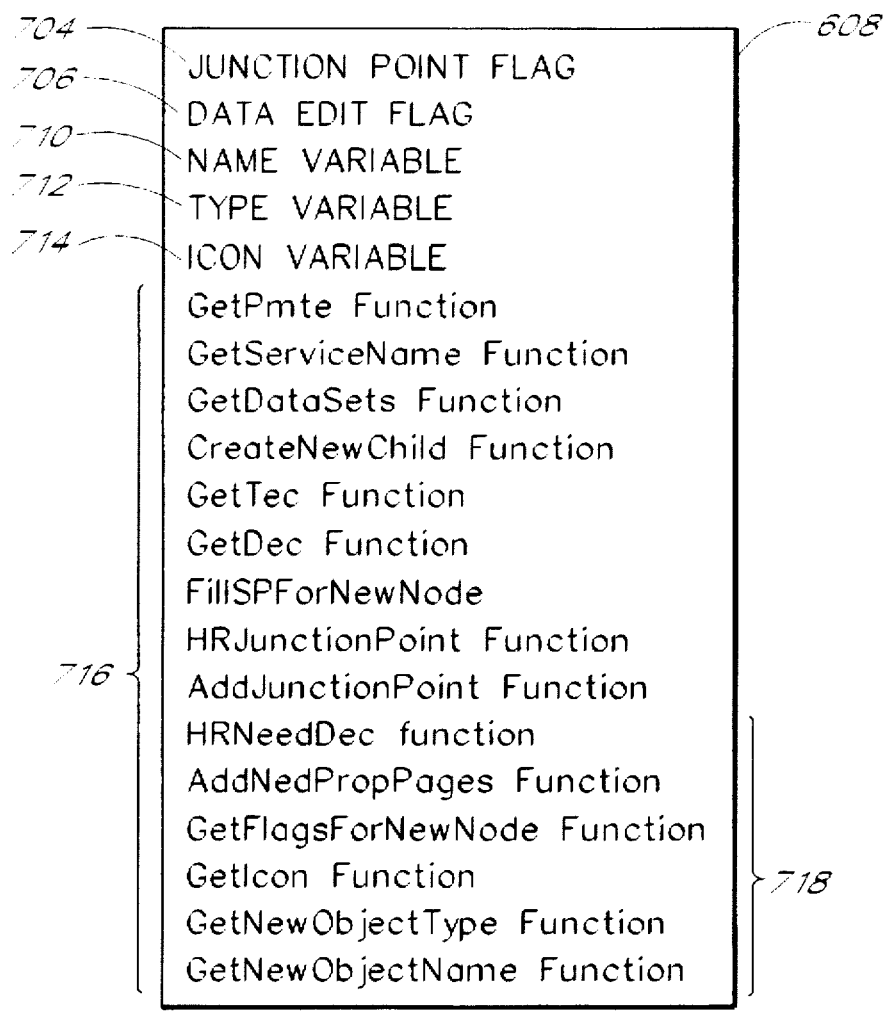
FIG. 7B is a detailed block diagram of a node editor of a preferred embodiment of the present invention.

Each tree edit object 608 references a particular node editor 304. FIG. 7B illustrates the content of one embodiment of the node editor 304. The node editor contains the data and software instructions that the tree edit object 608 references. Thus the node editor contains the junction point flag 704, the data edit flag 706, the name variable 710, the type variable 712, the icon variable 714 and the set of node editing functions 716. In other embodiments, the node editor 304 can contain customized versions of the node editing functions 718. The customized node editing functions retain the same names but implement different software instructions.

The default node editing functions required to enable the present invention include: a GetPmte function, a GetServiceName function, a GetDataSets function, a CreateNewChild function, a GetTec function, a GetDec function, a FillSPForNewNode function, a HRJunctionPoint function, an AddJunctionPoint function, a HRNeedDec function, an AddNedPropPages function, a GetFlagsForNewNode function, a GetIcon function, a GetNewObjectName function and a GetNewObjectType function. The customizable node editing functions include: the HRJunctionPoint function, the AddJunctionPoint function, the HRNeedDec function, the AddNedPropPages function, GetFlagsForNewNode function, the GetIcon function and the GetNewObjectType function.

Each node editor 304 uses standardized names for particular node editing functions. Each node editor 304, however, implements the named functions with its own software instructions. As new node editors 304 are added, the new node editors 304 will use the standardized function names but implement the functions in a different ways in order to edit the unique nodes associated with the new node editor 304. This allows new node editors 304 to implement new program instructions for editing new node types.

The set of editing functions 716 in the tree edit object 608 are point to the node editing functions in the node editor 304. As explained in more detail below, each node on the on-line network 100 is assigned to a particular node editor 304. When the present invention creates a new tree edit object 608, the tree edit object 608 references the set of editing functions 716 provided by the assigned node editor 304.

The tree modification interface object 610 contains a set of tree modification functions 720 which include an AddNode function, a DeleteNode function, a LinkNode function, an UnlinkNode function and a SetTreeProperties function. The set of tree modification functions 720 direct a hierarchical service application to add nodes, delete nodes, link nodes, unlink nodes and modify node properties.

The data modification interface object 612 contains a set of data modification functions 722 which include an Add function, a Delete function and a SetDataProperties function. The set of data modification functions 722 direct a non-hierarchical service application to add services, delete services and modify properties.

Referring now to FIG. 8A and 8B, a node editor table 800 and a new node information table 802 is shown. The node editor table 800 shown in FIG. 8A monitors the location of a node editor 304 in the local computer's random access memory. In the present invention, each tree edit object 608 references a particular node editor 304. The first time a type of tree edit object 608 is instantiated, the editing system locates the corresponding node editor 304 in the local computer's file system and loads the node editor 304 into the local computer's random access memory. The node editor table 800 monitors the memory locations of the loaded node editors 304.

In the preferred embodiment, the node editor table 800 is a two column table which contains many rows. Each row corresponds to a different node editor. The first column lists the different application identifiers 230 which correspond to different node editors 304. The second column lists the memory location 804 of the node editor 304 in the local computer's memory. For example, when the present invention loads the DirSrv node editor 304a into memory, it also loads the node editor table 800 with (1) the DirSrv application identifier 230 and (2) the memory location 804 of the DirSrv node editor 304a in the local computer's random access memory.

When a system operator accesses another node in the DirSrv namespace 136b, the present invention creates another a tree edit object 608. The editing system then uses the application identifier 230 to obtain the memory location 804 of the previously loaded DirSrv node editor 304a. Rather then loading a new copy of the DirSrv node editor 304a each time a tree edit object 608 is instantiated, the present invention references the DirSrv node editor 304a already existing in memory. This reduces memory consumption and saves execution time.

Referring now to FIG. 8b, the new node information table 802 lists the different types of nodes that a system operator can create. In the preferred embodiment, the new node information table 802 contains three columns and many rows. Each row corresponds to a different node type. The first column contains an application identifier 230, the second column contains a data set 806 and the third column contains the name 808 of different service and node types.

A data set 806 is a number which represents different types of a particular service. For example, in the on-line network 100, a bulletin board service 132 may exist for various bulletin boards on movies, books, theatrical productions, etc. These general public bulletin boards can be accessed by large numbers of end-users on the on-line network 100. In addition, the on-line network 100 can provide a different type of bulletin board service 132 for semi-private bulletin boards which are only accessed by an end-user's family or friends. Such bulletin boards will be accessed by only a few end-users. While the bulletin boards execute in a similar manner they provide different types of services. Thus, in the present invention, the general public bulletin boards and the semi-private bulletin boards are data sets 806 of the bulletin board service 132.

The present node editing system uses the new node information table 802 to create a system operator menu 510 which specifies the name 808 of node types that a system operator can create. In addition, the present node editing system uses the new node information table 802 to create sub menus 512 which specify the different data sets 806 a system operator can create.

Figure 9:
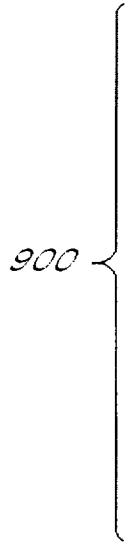
FIG. 9 illustrates a preferred basic set of privilege levels, and illustrates one possible assignment of access rights bits to the privilege levels.

Before an end-user can exercise his assigned system operator privileges, the present node editing system ensures that the end-user has system operator access rights. FIG. 9 illustrates a preferred basic set of end-user access rights 900, and the correspondence between these access rights 900 and the bits of the access rights values. Bits 0–6 correspond respectively to the end-user access rights 900 of viewer, observer, user, host, system operator, system operator manager, and super system operator, while bits 7–15 are reserved for future definition. Thus, for example, an access rights value of 0×0024 H hexadecimal (bits 2 and 5 set to one, and all others clear) indicates end-user access rights 900 of "system operator" and "user."

In other embodiments of the invention, the access rights values may directly specify the access operations that end-users can perform. For example, bit 0 may specify whether the end-user has read-only access, bit I may specify whether the end-user has read/write access, and so on.

In the preferred embodiment, the general privilege levels of FIG. 9 are transformed into specific "access capabilities" by the various on-line service applications (such as the chat service 130, the bulletin board service 132, and the DirSrv service 134). For example, the Chat service 130 may give moderator-type access capabilities to end-users that have the privilege level of "host." The access capabilities corresponding to a given privilege level may vary from on-line service to on-line service. Generally, however, the access capabilities within a given on-line service will be consistent with the following privilege-level "definitions":

Viewer (bit 0). If this bit is set, the end-user can see the existence of the service, but cannot open or access the service. The end-user may be given the ability to subscribe to the service (to obtain a higher privilege level with respect to the service).

Observer (bit 1). If this bit is set, the end-user can see the existence of the service and can open the service, but cannot actively participate in the service. (For example, an observer for a bulletin board folder node may be given read-only access to the messages within the folder).

User (bit 2). If this bit is set, the end-user can do whatever is "normal" for the particular service. For example, the end-user may be given the ability to post bulletin board messages within the bulletin board folders, or may be given the ability to actively participate in Chat-rooms.

Host (bit 3). If this bit is set, the end-user is given host-level or leadership-level privileges (where applicable) for the service. For example, the Chat service 130 may give the host user moderator privileges.

System Operator (bit 4). If this bit is set, the end-user is given the access rights 900 consistent with normal (entry-level) system operator activities for the service, such as the ability to delete bulletin board messages, or the ability to edit a certain subset of the properties of a node.

System Operator Manager (bit 5). If this bit is set, the end-user is given various ownership-type privileges with respect to the node. For example, the system operator manager for a given node may be given the ability to change any of the properties (e.g., name, icon ID, etc.) for that node.

Super System Operator (bit 6). If this bit is set, the end-user has no access restrictions.

As indicated by the foregoing, the access rights 900 definitions are generally open ended, giving the various services flexibility in assigning specific access capabilities to end-users. This is particularly true for the privilege levels of "user," "host," and "system operator," which may be translated into significantly different access capabilities by different services.

Advantageously, the privilege levels are not limited to predefined accesses capabilities such as read-only, read/write, modify, append and delete, but rather are flexible enough to include new types of access capabilities which the on-line network provider may later define. Thus, as new types of access capabilities are defined (when, for example, new services and new object types are created), these new access capabilities can be implemented using the existing user privilege levels. In other embodiments of the invention, the access rights values may correspond uniquely to pre-defined sets of access operations.

With further reference to FIG. 9, additional user privilege levels can be defined as needed (using bits 7–15) to achieve higher degrees of privilege-level granularity. Also, services can be configured to give special meaning to certain combinations of privilege level bits. For example, an on-line service could give special access capabilities to end-users that have both the "host" and "system operator" bits set.

Figure 10:
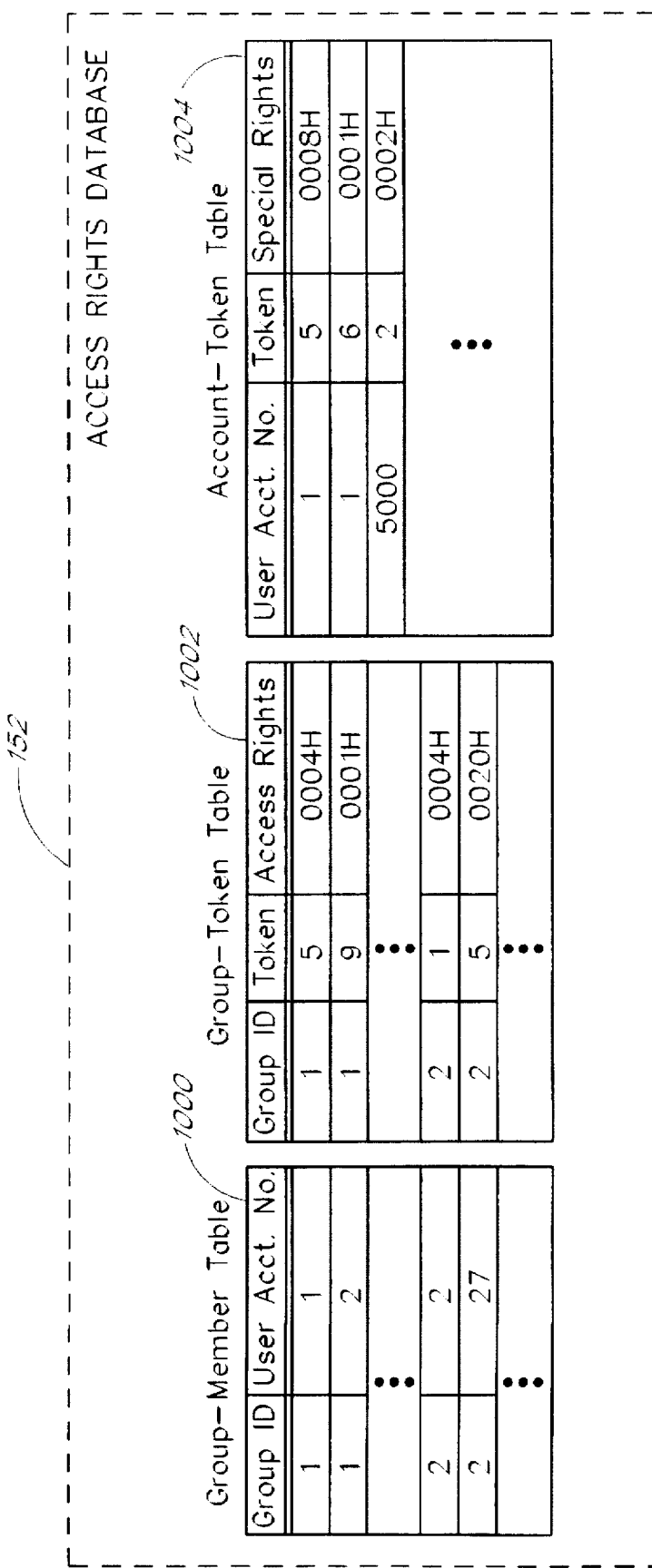
FIG. 10 illustrates a preferred accounts rights database which is used to store access rights data in accordance with the present invention, the numerical values in FIG. 10 are examples of possible table entries.

FIG. 10 illustrates an access rights database 152 that contains three tables: a group-member table 1000, a group-token table 1002 and an account-token table 1004. These three tables specify, for each end-user of the network, both (1) the security tokens 220 assigned to each end-user, and (2) the access rights 900 which the security tokens 220 grant to an end-user. These three tables are stored in the security service 150 within the on-line network 100.

Each row of the group-member table 1000 specifies a group that an end-user may belong to and is primarily used to group similar types of end-users. Each row of the group-token table 1002 specifies the security access rights 900 associated with each security token 220. Each row of the account-token table 1004 corresponds to a respective end-user account of the on-line network 100 and the security tokens 220 assigned to that end-user account.

When an end-user selects a node, the node editing system of the present invention sends (1) the selected node's security token 220 and (2) the end-user's account number to the security service 150. The security service 150 uses the end-user's account number to identify the security tokens 220 assigned to the end-user in the account-token table 1004. If the security service 150 determines from the account-token table 1004 which the end-user has the node's security token 220, the security service 150 obtains the access rights 900 for that security token 220 from the group-token rights table 1002. Furthermore, a person skilled in the art can appreciate that the access rights database 152 can be implemented using any number of different programming techniques including different relational database structures, tables, arrays, functions and subroutines which implement a general scheme of security access rights 900 and protocols without departing from the scope of the present invention.

b. Creation Of A Node

Figure 11:
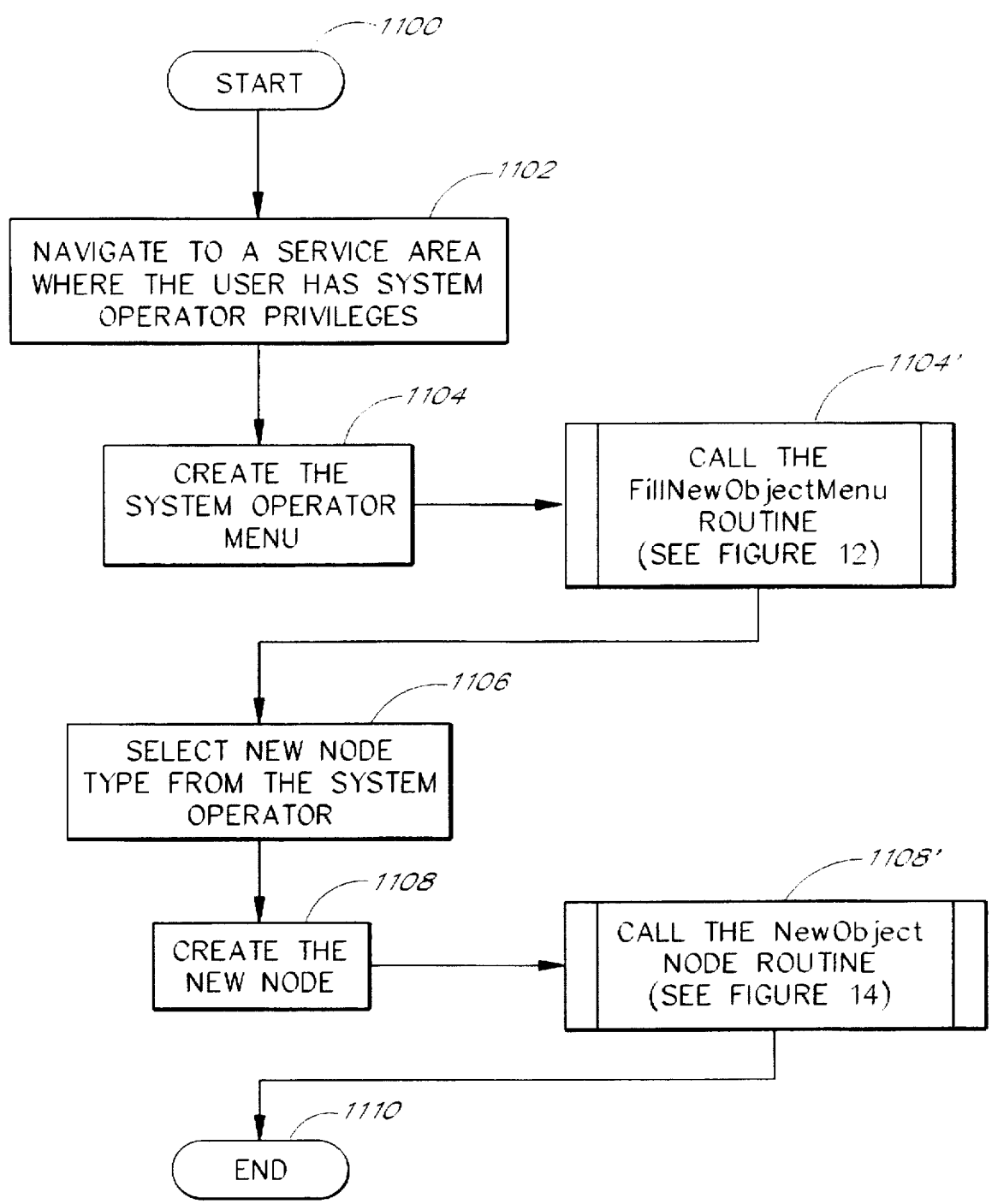
FIG. 11 is a flow chart illustrating the steps to create a node in the preferred embodiment of the present invention.

FIG. 11 illustrates a flow chart of the sequence of states the present invention executes to create a node within the on-line network 100. Upon activation of an end-user's computer, in start state 1100, the computer loads the operating system and displays the operating system user interface or computer shell 300. In the preferred embodiment, the end-user views the Win 95 Explorer which creates the computer shell object 600 and the window object 602. The computer shell object 600 and the window object 602 contain the data and functions known to one of ordinary skill in the art for displaying a user interface on the local computer 102 and for processing input commands entered by the end-user. In the preferred embodiment, the Win 95 Explorer creates the computer shell object 600 and the window object 602. While in start state 1100, an end-user can assess the on-line network 100 and navigate to an area where the end-user has system operator privileges.

When the end-user directs the computer shell 300 to access the on-line network 100 (for example, via a menu command or icon selection), the computer shell 300 passes the globally unique identifier for the on-line network 100 to the CoCreateInstance function in the Object Linking and Embedding module located in the operating system of the local computer 102. The OLE CoCreateInstance function uses the globally unique identifier of the on-line network 100 as an index into an OLE table which associates the globally unique identifier with the network shell dynamic link library. The CoCreateInstance function then loads the network shell dynamic link library into the computer's memory. The CoCreateInstance function is well known in the art, and is described in OLE 2 *Programmer's Reference Vol. I*, Microsoft Press, 1993, pp. 256 and in OLE 2 *Programmer's Reference Vol. II*, Microsoft Press, 1993, pp. 56–62, and Brockschmidt, *Inside OLE 2*, Microsoft Press, 1994, pp. 149–152.

While in start state 1100, the CoCreateInstance routine instantiates the shell folder object 604. The computer shell 300 then directs the shell folder object 604 to instantiate a node pointer object 606 which references the on-line root folder node 204a. The network shell 302 then executes a number of user interface functions (also called navigator functions) which create the user interface shown in FIG. 4. This process is repeated for every folder node which the end-user of the local computer 102 accesses.

Each time an end-user selects a new node in the DirSrv namespace 136b by selecting the node with a mouse device or inputting keyboard commands, the DirSrv service 134 sends the end-user's account number and the security token 220 of the selected node to the security service 150. Proceeding to state 1102, the security service 150 uses the end-user's account number as index into the account-token table 1004 to identify the security tokens 220 assigned to the end-user account. The security service 150 then compares the end-user's assigned security tokens 220 to the security token 220 of the selected node.

If the account-token table 1004 indicates that the end-user account contains a copy of the node's security token 220, the security service 150 accesses the group-token table 1002 to obtain the access rights 900 associated with the security token 220. If the end-user has been assigned system operator rights, the access rights 900 in the group-token table 1002 will indicate the type of system operator rights (system operator, system operator manager or super system operator rights) assigned to the end-user.

Once the editing system has determined that the end-user has system operator rights in state 1102, the editing system, as shown in FIG. 11, proceeds to state 1104. In state 1104, the network shell builds a system operator menu 510. The network shell directs the node pointer object 606 to create the system operator menu 510 by calling the FillNewObjectMenu function in the node pointer object 606. FIG. 12 illustrates a flow chart of the execution states that build the system operator menu 510.

Figure 5:
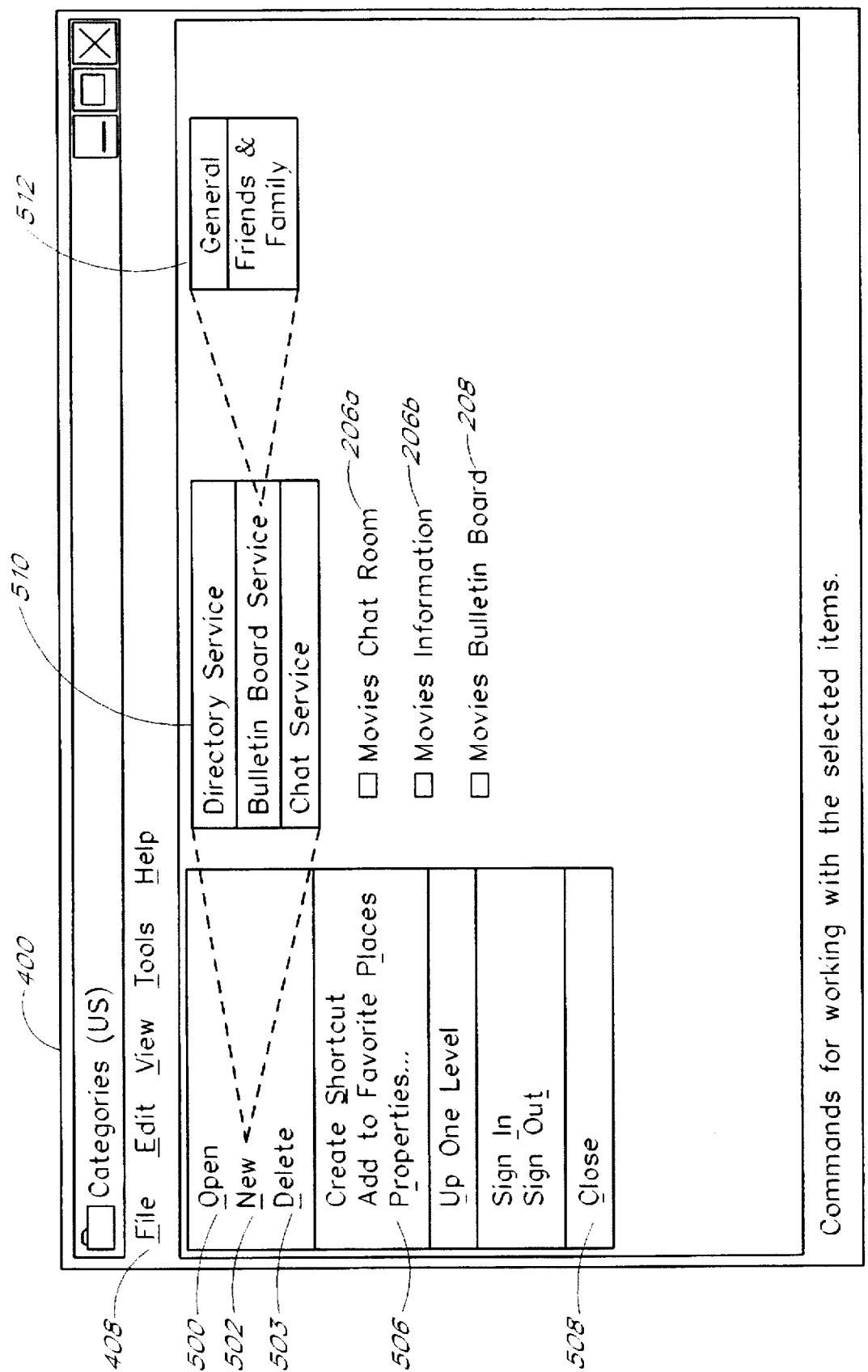
FIG. 5 is a diagram illustrating one embodiment of the system operator menu created by the editing system of a preferred embodiment of the present invention.

Referring now to FIG. 12, beginning in a start state 1104, the FillNewObjectMenu function uses known menuing techniques to add the File/New command 502 to the File menu displayed in FIG. 5. This File/New command 502 is similar to the command an end-user selects when creating a new folder in the end-user's local storage device. Thus, the File/New command 502 displayed by the present invention allows an end-user to create a node in the on-line network 100 in a manner that is similar to the creation of a new folder in his local computer 102 file system.

Once the end-user selects File/New command 502 in start state 1104, the FillNewObjectMenu function proceeds to state 1200. In state 1200, the FillNewObjectMenu function begins a unique process of displaying the types of new nodes a system operator can create. The list of node types that the system operator can create exists in the new node information table 802. When the FillNewObjectMenu function is first invoked, the FillNewObjectMenu function instantiates the new node information table 802. The new node information table 802 is then used by the FillNewObjectMenu function each time it creates a system operator menu 510.

Figure 12A:
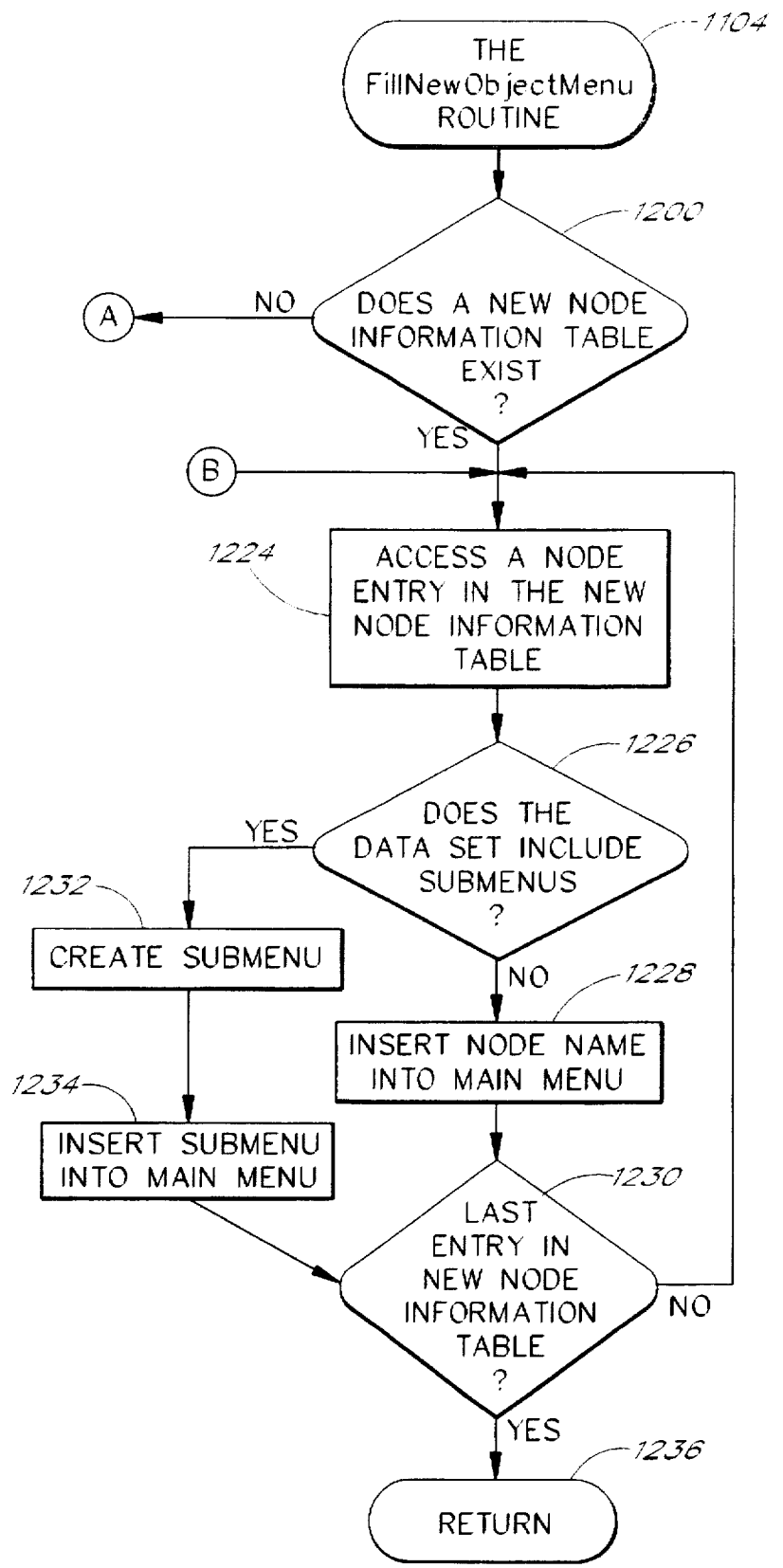
FIGS. 12A and 12B illustrate a flow chart of a routine which builds the system operator menu in a preferred embodiment of the present invention.
Figure 12B:
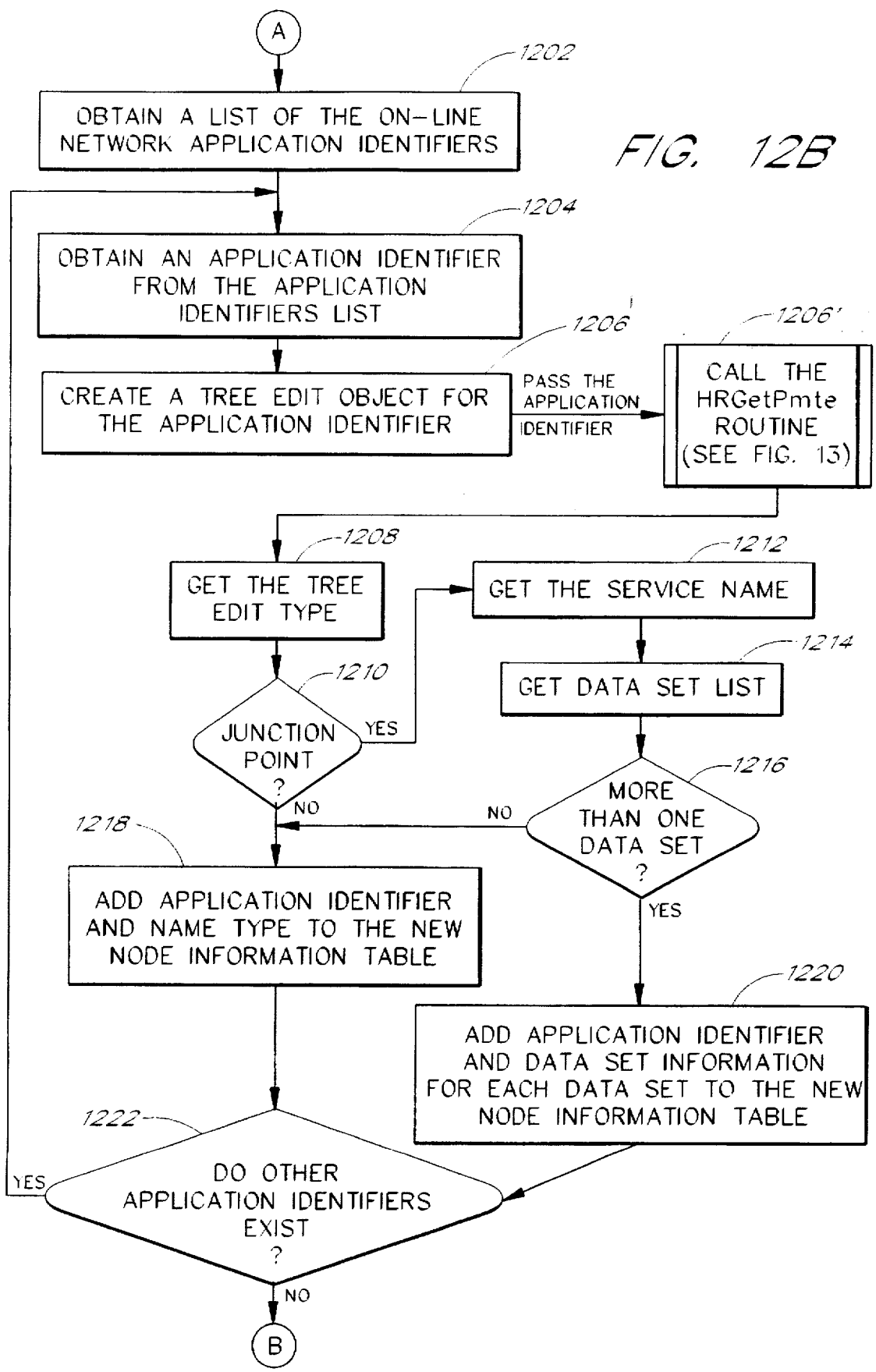

If the new node information table 802 does not exist (the system operator session just started), the FillNewObjectMenu function proceeds to state 1202 illustrated in FIG. 12B and initializes the new node information table 802. The FillNewObjectMenu function initializes the new node information table 802 by obtaining the different node types supported by the editing system of the present invention. In addition, during the process of building the new node information table 802, the FillNewObjectMenu function invokes the node editors corresponding to the different node types.

The flow chart in FIG. 12B illustrates the states FillNewObjectMenu function executes to initiate the new node information table 802 and invoke the node editors. These states include obtaining a list of application identifiers 230 and data sets 806 that define the different node types supported by the on-line network 100, creating a tree edit object 608 for each node type and initializing the new node information table. As explained in more detail below, the tree edit objects 608 reference the different node editors 304 corresponding to the different node types.

In state 1202, the FillNewObjectMenu function obtains a list of the application identifiers 230 supported by the on-line network 100. In the preferred embodiment, the FillNewObjectMenu function obtains the application identifiers 230 from a component manager. The component manager is a client application existing in the end-user's local computer 102 which maintains a list of up-to-date application identifiers 230. A person skilled in the art can appreciate, however, that the application identifiers 230 can be implemented using any number of different programming techniques that obtain up-to-date application identifiers 230 and data sets 806 from the on-line network 100 without departing from the scope of the present invention.

Proceeding to state 1204, the FillNewObjectMenu function selects one of the application identifiers 230 and proceeds to state 1206. In state 1206, the FillNewObjectMenu function instantiates a tree edit object 608 for each node type defined by the application identifiers 230. During the instantiation of the tree edit object 608 the present invention loads the node editor into the memory of the end-user's local computer 102.

Figure 13:
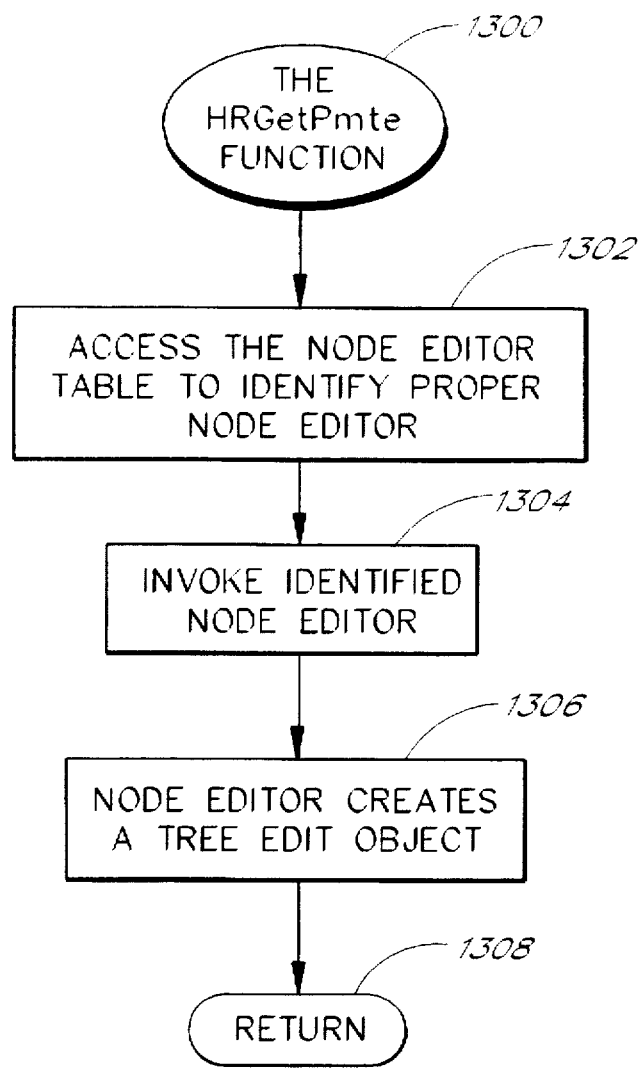
FIG. 13 is a flow chart illustrating a routine which creates a tree edit object in one presently preferred embodiment of the present invention.

In the preferred embodiment, the FillNewObjectMenu function and calls the HRGetPmte function while in state 1204. The HRGetPmte function exists in the node pointer object 606. The HRGetPmte acronym stands for "get a pointer to the microsoft tree edit object." When calling the HrGetPmte function in state 1208, the FillNewObjectMenu function passes the application identifier 230 to the HRGetPmte function. FIG. 13 illustrates a flow chart of the execution states that automatically loads the proper node editor into memory and instantiates a tree edit object 608.

Beginning in a start state 1300, the HRGetPmte function proceeds to state 1302. In state 1302, the HRGetPmte function determines whether the desired node editor has already been loaded into a memory location 804 by accessing the node editor table 800. In this example, the system operator session has just begun and the present invention loads the node editor dynamic link library from the storage device in the local computer 120.

Thus, in state 1302, the HRGetPmte function obtains the path to the desired node editor dynamic link library. In the preferred embodiment, the HRGetPmte function obtains the path to the dynamic link library from a module called the component manager. In one embodiment, the component manager stores the node editor's file location in a table. A person skilled in the art can appreciate, however, that the file location of the node editor 304 can be stored with a variety of different programming techniques that store the node editor file locations such as directories, arrays, and lists without departing from the scope of the present invention.

Proceeding to state 1304, the HRGetPmte function loads the desired node editor dynamic link library into the local computer's random access memory. When loading the node editor 304, the HRGetPmte function updates the node editor table 800 with (1) the application identifier 230 of the node editor 304 and (2) the memory location 804 of the node editor 304 in the local computer's random access memory. Storing the node editor's memory location 804 allows the present invention to reuse the node editor 304 rather than having to reload the node editor 304 each time the node editor 304 is needed to edit a particular node.

Proceeding to state 1306, the HRGetPmte function directs the node editor 304 to create the tree edit object 608 defined by that node editor 304. In the preferred embodiment the HRGetPmte function in the node pointer object 606 directs the node editor to create the tree edit object 608 with a standardized create tree edit object function called the GetPmte function. Although the GetPmte function has a name which is similar to the HRGetPmte function, the two functions perform different programmed instructions. As discussed above, the HRGetPmte function exists in the node pointer object 606 and calls that GetPmte function existing in the node editor. The node editor 304 then instantiates the tree edit object 608.

After instantiating the tree edit object 608, the node editor loads the tree edit object 608 with the junction point flag 704, data edit flag 706, name variable 710, type variable 712, icon variable 714 and other properties defined by the node editor 304. These variables are stored in the programming instructions of the node editor 304 and loaded into the tree edit object 608 during creation of the tree edit object 608. For example, the DirSrv node editor 304 contains the value of the junction point flag 704 the data edit flag 706, the icon variable 714, the name variable 710 and the node type for a node in the DirSrv namespace 136b. For example, when the DirSrv node editor 304a instantiates a tree edit object 608, the node editor loads these predefined values into the newly instantiated tree edit object 608. Furthermore, the DirSrv node editor 304a creates the pointers in the tree edit object 608 which point to the set of default node editing functions 716 and the set of customized node editing functions 718 contained within the DirSrv node editor 304a.

After instantiating the tree edit object 608, the node editor returns control back to the HRGetPmte function in state 1306. Thus, the HRGetPmte function identifies the proper node editor 304, automatically loads the proper node editor 304 into memory and instantiates the tree edit object 608 that references the default and customized editing functions 716 and 718 existing in the node editor 304. The HRGetPmte function then proceeds to state 1308 where it returns control back to the FillNewObjectMenu function.

Referring now to FIG. 12B, the FillNewObjectMenu function, in state 1206 has created a tree edit object 608 and loaded the node editor 304 referenced by the tree edit object 608. Proceeding to state 1208, the FillNewObjectMenu obtains the tree edit object 608 type. In the preferred embodiment, the FillNewObjectMenu function calls the GetNewObjectType function existing in the tree edit object 608.

In one embodiment, the GetNewObjectType function accesses and returns the type variable 712 located in the tree edit object 608. In other embodiments, however, the GetNewObjectType function can include customized programmed instructions that support new node types. For example, a customized GetNewObjectType function could access the on-line network 100 and obtain additional information about the node type.

Proceeding to state 1210, the FillNewObjectMenu function determines whether the new tree edit object 608 relates to a service namespace 136 which can be the target of a junction point node 208. For example, the bulletin board service namespace 136 can contain target nodes that are referenced by the main catalog in the DirSrv namespace 136b. In the preferred embodiment, the junction point nodes 208 link one hierarchically organized service namespace 136 to another hierarchically organized service namespace 136 and allows the editing system to grant system operator access rights independent of the hardware implementation. Although the two services exist on different servers 120, the end-user can use the editing system to edit the content existing in both services. In future embodiments, it is envisioned that junction point nodes 208 will also link hierarchically and non-hierarchically organized service namespaces.

If the tree edit object 608 supports junction point nodes 208, the junction point flag 704 is set to true at the time the tree edit object 608 is created. In the preferred embodiment, the FillNewObjectMenu function calls the HRJunctionPoint function existing in the tree edit object 608. In one embodiment, the HRJunctionPoint function accesses the junction point flag 704 in the tree edit object 608 and returns a true value if the tree edit object 608 relates to a service namespace 136 which contains junction point nodes 208. In other embodiments, the HRJunctionPoint can include customized programmed instructions that limit the number of junction points, or limit the creation of junction points to certain users.

If the value of the junction point flag 704 is true, the FillNewObjectMenu function proceeds to state 1212. In state 1212, the FillNewObjectMenu function obtains the name of the hierarchically organized service referenced by the tree edit object 608. In the preferred embodiment, the FillNewObjectMenu function calls the GetServiceName function existing in the tree edit object 608. In one embodiment, the GetServiceName function accesses the name variable 710 in the tree edit object 608 and returns the name of the service. Since the GetServiceName function is customizable, other embodiments can implement different programmed instructions for obtaining the service name.

Proceeding to state 1214, the FillNewObjectMenu function determines whether the tree edit object 608 also relates to a service with multiple data sets 806. In the preferred embodiment, different types of similar services can exist. For example, in the on-line network 100, the bulletin boards in one type of bulletin board service 132 can be accessed by large numbers of end-users (called the general public bulletin board service 132), while the bulletin boards in another type of bulletin board service 132 are semi-private and can only be accessed by small groups of end-users (called the "friends and family" bulletin board service 132). In the present invention, both the general public bulletin boards and the friends and family bulletin boards are called data sets 806 or subgroups of bulletin board type services 132.

To determine whether a service includes multiple data sets 806, the preferred embodiment calls the GetDataSets function existing in the tree edit object 608. Since the number of data sets 806 will periodically change as the on-line network 100 grows in size. the GetDataSets function accesses a data set global registry in the on-line network 100. The data set global registry is a table that contains all of the data sets 806 supported by the on-line network 100.

Proceeding to state 1216, the FillNewObjectMenu function evaluates the value of the data sets 806 that correspond to a particular application identifier 230. If no data sets 806 exist for a particular application identifier 230, the data set 806 has a value of zero and the FillNewObjectMenu function proceeds to state 1218. If data sets 806 do exist, the FillNewObjectMenu function proceeds to state 1220.

In state 1220, the FillNewObjectMenu function adds the application identifier 230 for each data set 806 to the new node information table 802. As explained below, the data sets 806 are used to create sub menus 512 which identify the different types of data sets 806 a system operator can create. When adding the data set 806 to the new node information table 802, the FillNewObjectMenu function loads the application identifier 230 in the first column, the data set 806 in the second column and the name 808 of the node type in the third column of the new node information table 802. The FillNewObjectMenu creates a new entry in the node information table 802 for each data set 806 and then proceeds to state 1222.

Returning to state 1210, if the tree edit object 608 does not support junction points (the tree edit object 608 references a non-hierarchically organized service), the FillNewObjectMenu proceeds to state 1218. In state 1218, the FillNewObjectMenu function sets the value of the data set 806 to zero (in the presently preferred embodiment, different types of non-hierarchical services do not exist). The FillNewObjectMenu function then adds the application identifier 230, data set 806 and the name 808 of the node type to the new node information table 802. For example, if the tree edit object 608 relates to a node in the non-hierarchically organized chat service 130, the FillNewObjectMenu function stores the application identifier 230, a data set 806 equal to zero and the name 808 of the chat service node type (a chat room node) in the new node information table 802.

If in state 1216 the tree edit object 608 relates to a hierarchically organized service which does not contain data sets 806, the FillNewObjectMenu function also proceeds to state 1218. For example, in the preferred embodiment, only one version of the hierarchically organized DirSrv service 134 exists. Accordingly, the DirSrv service 134 does not contain any data sets 806 and the FillNewObjectMenu function proceeds to state 1218 where it stores the application identifier 230, a data set 806 equal to zero and the name 808 of the DirSrv node type (a DirSrv node) in the new node information table 802.

Proceeding to state 1222, the FillNewObjectMenu function determines whether other application identifiers 230 exist in the application identifier list. If other application identifiers 230 exist, the FillNewObjectMenu function proceeds to state 1204 and again proceeds to build a new entry in the new node information table 802. Once the FillNewObjectMenu function has completely initialized the new node information table 802, the FillNewObjectMenu function proceeds from state 1222 to state 1224 in FIG. 12A.

Preinitializing the new node information table 802 provides many advantages. For example, by preinitializing the new node information table 802, the present invention can create a system operator menu 510 which shows the system operator the types of nodes the system operator can create. Furthermore, the new node information table 802 provides up-to-date information about new node types and new data sets 806 added to the on-line network 100. Yet another advantage is that the initialization process preloads all the customized node editors 304 into the local computer's random access memory. Thus, when the system operator desires to edit a particular node the appropriate node editor 304 is quickly accessed.

After initializing the new node information table proceeds to state 1224 as shown in FIG. 12A. In state 1224, the FillNewObjectMenu function begins the process of creating the cascading system operator menu 510. While in state 1224, the FillNewObjectMenu function accesses a row in the new node information table 802 and obtains the application identifier 206, data set 806 and name 808 of a node type.

Proceeding to state 1226, the FillNewObjectMenu function checks the data set 806 column to determine if multiple data sets 806 exist. If a data set 806 does not exist (date set value is set to zero) the FillNewObjectMenu function proceeds to state 1228 and inserts the name 808 of the node type into the system operator menu 510.

Proceeding to state 1230, the FillNewObjectMenu function checks to see if the new node information contains additional row entries. If so, the FillNewObjectMenu function returns to state 1224 and accesses the next entry in the new node information table 802. If in state 1226, the next entry contains sub-menus 512, the FillNewObjectMenu function proceeds to state 1232.

In state 1232, the FillNewObjectMenu function creates a sub-menu 512. For example, if the next entry contains the data set 806 for the friends and family bulletin boards, the sub menu 512 adds the "friends and family" name 808 to the bulletin board sub-menu. In state 1234 the FillNewObjectMenu function inserts the sub-menu into the system operator menu 510.

Proceeding to state 1230, the FillNewObjectMenu function again checks to see if the new node information contains additional row entries. After accessing each entry in the new node information table 802 and creating the system operator menu 510, the FillNewObjectMenu function proceeds to return state 1236 and returns control back to the network shell in state 1104 as illustrated in FIG. 11.

This unique technique of building a system operator menu 510 provides many advantages. For example, the system operator menu 510 is integrated with the windows 400 and menus created by the computer shell 300 and the network shell 302. Further, the system operator menu 510 uses familiar commands so that a system operator does not need specialized training. Yet another advantage is that the system operator menu 510 contains the information necessary to automatically invoke a desired node editor 304 when the system operator directs the present invention to create a new node.

Referring now to FIG. 11, the node editing system proceeds to state 1106 and waits for the system operator to direct the editing system to create a new node. The system operator directs the editing system to create the new node by selecting a node type from the system operator menu 510. Selection of a node type is accomplished via a variety of techniques known to one of ordinary skill in the art such as monitoring the keyboard, a mouse input device, a voice input device, etc. Once the system operator selects the new node type from the newly created system operator menu 510, the editing system proceeds to state 1108.

In state 1108, the present invention creates the selected node. To create the selected node, the network shell in the preferred embodiment calls the NewObject function. The NewObject function exists in the node pointer object 606.

While in state 1108, the NewObject function builds the data structure necessary to create the new node and adds the new node to one of the existing folder nodes in a service namespace 136.

As explained above, the folder nodes 204 provide the organizational structure of a service namespace 136 since a folder node 204 can reference other nodes. The organizational structure of a service namespace 136 is similar to a pedigree where folder nodes at one level (parent folder nodes) contain nodes in the next level (child nodes). The child nodes include child folder nodes 204, child leaf nodes 206 and child junction point nodes 208. For example, the movies folder node 204d illustrated in FIG. 2 is a parent folder node which contains three children nodes—the movies information leaf node 206b, the movies chat room leaf node 206a and the new movie reviews bulletin board junction point node 208.

While in state 1108, the NewObject function creates a tree edit object 608 for the parent folder node (called the parent tree edit object 608) and a tree edit object 608 for the new child node (called the temporary tree edit object 608). The parent tree edit object 608 references the node editor 304 of the parent folder node while the temporary tree edit object 608 references the node editor 304 of the new child object. This unique implementation allows a new child node to differ in type than the parent folder node since both the parent folder node and the new child node can reference entirely different node editors 304.

For example, the parent tree edit object 608 for the movies folder node 204d references the DirSrv node editor 304a. With the present invention, the system operator can create a new child chat room leaf node 206a in the DirSrv service 134 which references the chat service 130. Accordingly, the temporary tree edit object 608 corresponding to the new chat room references the chat node editor 304c. Thus, the unique implementation of the present invention allows the use of different node editors 304 and the creation of child nodes which reference different node editors 304 than their parent folder nodes. In addition, the unique implementation of the present invention automatically invokes the proper node editor 304 for each of the nodes.

Figure 14:
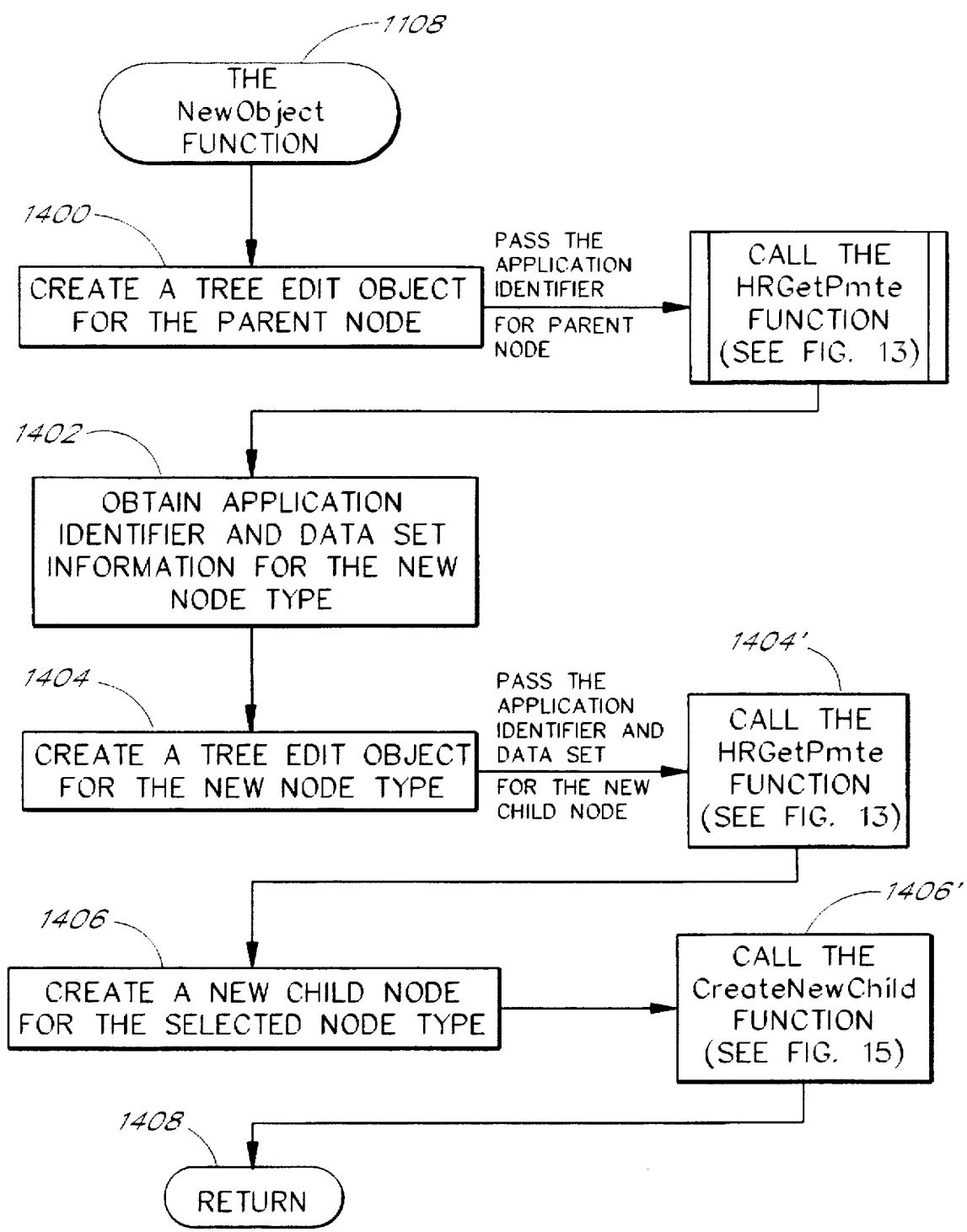
FIG. 14 is a flow chart illustrating a routine which creates a new node in a preferred embodiment of the present invention.

The detailed flow chart for the NewObject function is illustrated in FIG. 14. Beginning in a start state 1108, the NewObject function proceeds to state 1400. In state 1400, the NewObject function creates a parent tree edit object 608 for the parent node. While in state 1400, the NewObject function obtains the application identifier 230 and data set 806 of the selected node from the parent node pointer object. The node pointer object references the parent folder node 204 and contains the application identifier of the parent folder node. The application identifier 230 is then used to create the parent tree edit object. In state 1400, the NewObject function directs the HRGetPmte function to create the parent tree edit object 608 by calling the HRGetPmte function and passing the application identifier 230 of the parent folder node to the HRGetPmte function.

As explained above, the HRGetPmte function exists in the node pointer object 606 and stands for "get a pointer to the microsoft tree edit object." The HRGetPmte function, as illustrated in FIG. 13, accesses the node editor table 800 in state 1302 and determines the memory location 804 of the node editor 304 in the local computer's random access memory (the node editor 304 was previously loaded into the computer's random access memory during initialization). Thus in state 1304 the node editor has already been invoked. For example, if the parent folder node exists in the DirSrv namespace 136b, the application identifier 230 identifies the memory location 804 of the DirSrv node editor 304a.

Proceeding to state 1306, the HRGetPmte function then directs the node editor 304 to instantiate the parent tree edit object 608 defined by that node editor 304. In the preferred embodiment, as explained above, the HRGetPmte function in the node pointer object 606 directs the node editor to instantiate the parent tree edit object 608. After instantiating the parent tree edit object 608, the node editor loads the tree edit object 608 with the junction point flag 704, data edit flag 706, icon variable 714, system name 710 and system type 712 defined by the node editor 304, the set of default node editing functions and the set of customized node editing functions implemented by the node editor 304.

For example, the DirSrv node editor 304 contains the value of the junction point flag 704, the data edit flag 706, the icon variable 714, the system name and the node type for a node in the DirSrv namespace 136b. When the DirSrv node editor 304a instantiates the parent tree edit object 608, the DirSrv node editor 304a loads these predefined values into the tree edit object 608 for the parent folder node. Furthermore, the node editor creates the pointers which point to the set of default and customized node editing functions 716 and 718 implemented by the DirSrv node editor 304a.

After creating the parent folder tree edit object 608, the node editor returns control back to the HRGetPmte function in state 1306 and the HRGetPmte function then proceeds to return state 1308. Thus, the HRGetPmte function automatically determines the node editor for the parent node, accesses the node editor 304 in the local computer's memory and instantiates the parent tree edit object 608. In return state 1308, HRGetPmte function then returns control back to the NewObject function in state 1400.

Referring now to FIG. 14, after creating the parent tree edit object 608 in state 1400, the NewObject function proceeds to state 1402. In state 1402, the NewObject function obtains the application identifier 230 and the data set 806 for the new child node from the new node information table 802. Proceeding to state 1404, the NewObject function creates a temporary tree edit object 608 for the new child node. In the preferred embodiment, the NewObject function again calls the HRGetPmte function, but this time passes the application identifier 230 and data set 806 for the new child node.

The HRGetPmte function uses the passed application identifier 230 to access the node editor table 800 and determine the memory location 804 of the node editor 304 for the desired child node in the local computer's random access memory (the node editor 304 was previously loaded into the computer's random access memory during initialization). The HRGetPmte function then directs the identified node editor 304 to create the temporary tree edit object 608. For example, if the desired new child node is a chat room, the chat node editor 304c creates a temporary tree edit object 608 and loads the tree edit object 608 with the chat room node values. The HRGetPmte function then returns control back to the NewObject function.

Once the NewObject function creates the parent tree edit object 608 for the parent folder node and the temporary tree edit object 608 for the desired child node, the NewObject function proceeds to state 1406. In state 1406, the NewObject function creates the desired child node in the on-line network 100. To create the desired child node in the preferred embodiment, the NewObject function calls the CreateNewChild function existing in the parent tree edit object 608.

Figure 15:
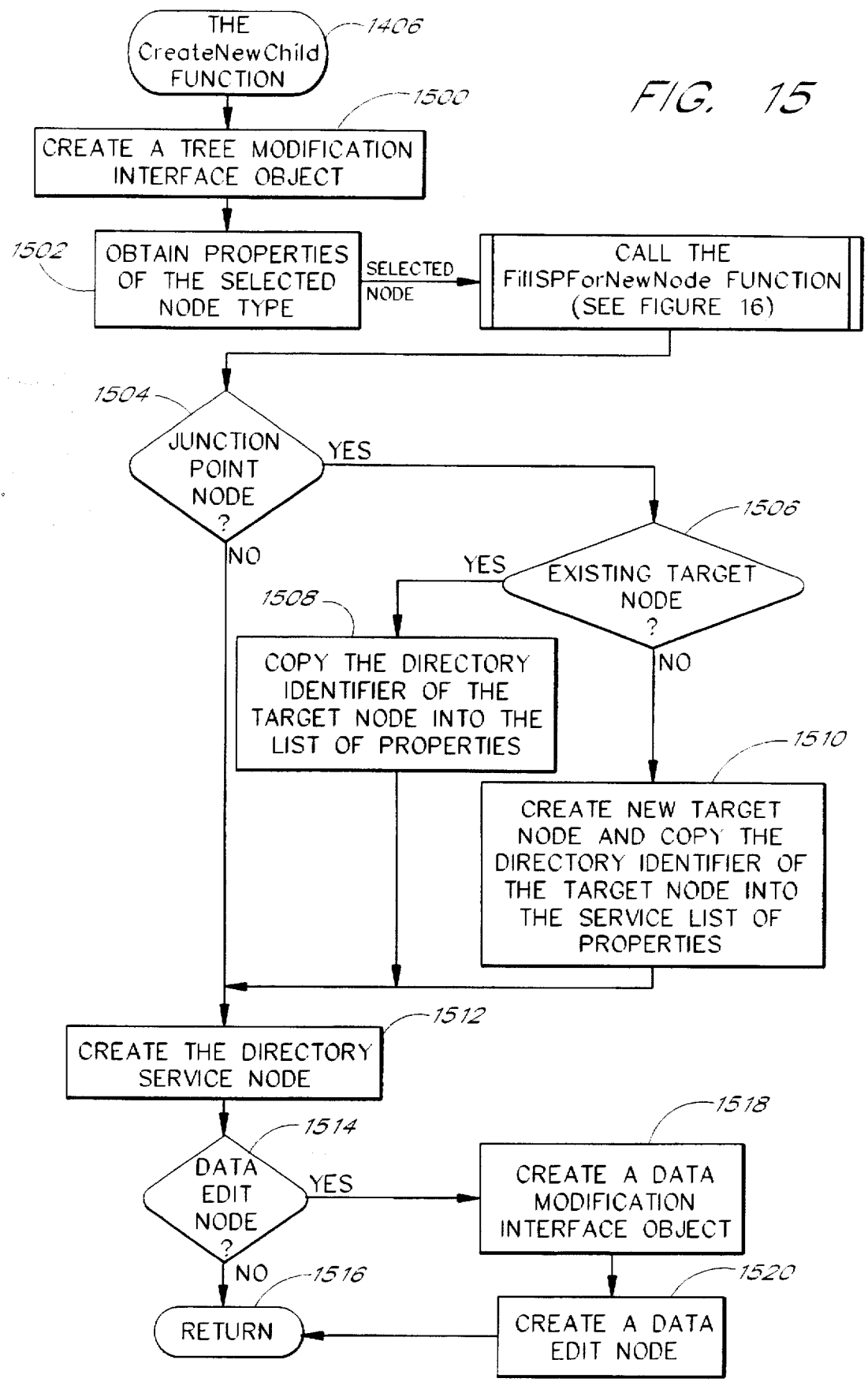
FIG. 15 is a flow chart illustrating a routine which creates a new child node in the on-line network in a preferred embodiment of the present invention.

A flow chart illustrating the CreateNewChild function is shown in FIG. 15. Beginning in a start state 1406, the CreateNewChild function proceeds to state 1500. In state 1500 the CreateNewChild function creates the tree modification interface object 610. The tree modification interface object 610 provides the communication functions which communicate with the hierarchically organized services.

In the preferred embodiment, the CreateNewChild function calls the GetTec function in the parent tree edit object 608. The GetTec function instantiates the tree modification interface object 610 which contains an Addnode function. The AddNode function acts like a client application and communicates with the service applications in the on-line network 100 via remote procedure calls. After creating the tree modification interface object 610, the GetTec function returns control back to the NewObject function.

Figure 16:
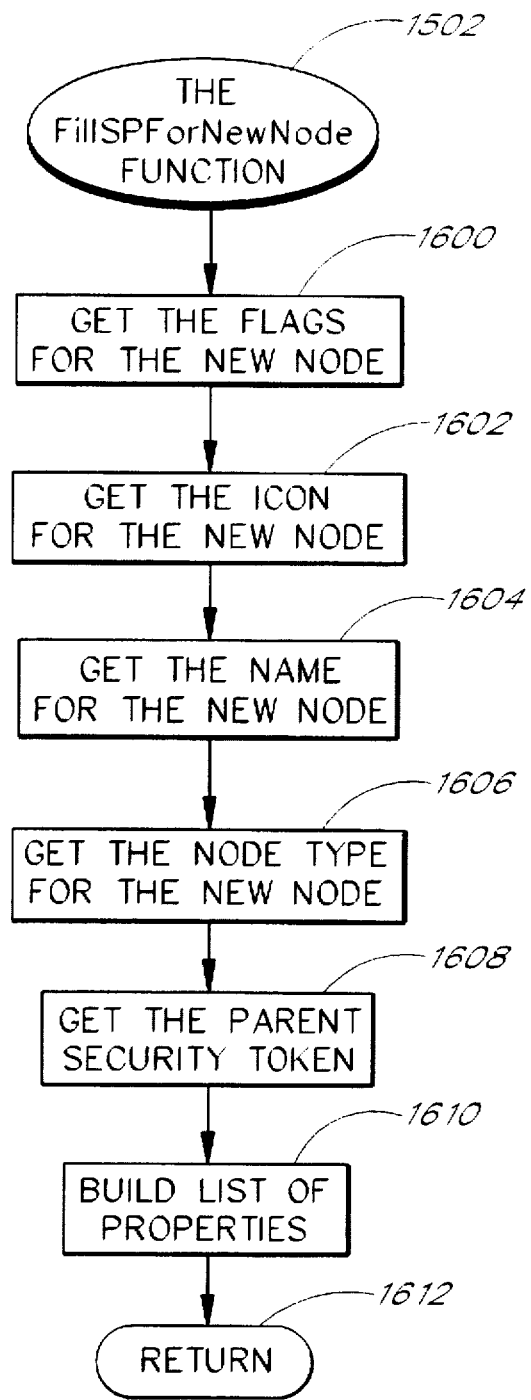
FIG. 16 is a flow chart illustrating a routine which obtains node properties for a new node in one presently preferred embodiment of the present invention.

Proceeding to state 1502, the NewObject function obtains the properties of the node type the system operator desires to create. In the preferred embodiment, the NewObject function obtains the properties by calling the FillSPForNewNode function. While in state 1502, the FillSPForNewNode function obtains a list of node properties for the new node. The FillSPForNewNode acronym stands for "fill the service properties list for the new node." A detailed flow chart of the FillSPForNewNode function is illustrated in FIG. 16.

The FillSPForNewNode function begins in a start state 1502, and proceeds to state 1600. In state 1600, the FillSPForNewNode function gets the flags 216 for the new node by accessing the temporary tree edit object 608. As explained above, the temporary tree edit object 608 references the node editor 304 for the new node type and contains the properties of the new node type. In the preferred embodiment, the FillSPForNewNode function calls the GetFlagsForNewNode function in the temporary tree edit object 608. In one embodiment, the GetFlagsForNewNode function accesses and returns the flags 216 in the temporary tree edit object 608. In other embodiments, however, the GetFlagsForNewNode function can include customized programmed instructions that returns the flags for new node types.

Proceeding to state 1602, the FillSPForNewNode function gets the icon identifier 214 for the new node by again accessing the temporary tree edit object 608. In the preferred embodiment, the FillSPForNewNode function calls the GetIcon function in the temporary tree edit object 608. In one embodiment, the GetIcon function accesses the icon variable 714 and returns the icon identifier 214 in the temporary tree edit object 608. In other embodiments, however, the GetIcon function can include customized programmed instructions that returns different icons or accesses different data sources to obtain the icon such as an icon file or cache.

Proceeding to state 1604, the FillSPForNewNode function gets the name 210 of the new node (i.e., a DirSrv folder node or a new bulletin board node) by again accessing the temporary tree edit object 608. In the preferred embodiment, the FillSPForNewNode function calls the GetNewObjectName function in the temporary tree edit object 608. In one embodiment, the GetNewObjectName function accesses and returns the node name 210 stored in the temporary tree edit object 608. In other embodiments, however, the GetNewObjectName function can include customized programmed instructions that accesses different data sources to obtain the node name 210.

Proceeding to state 1606, the FillSPForNewNode function gets the type of the new node (i.e. DirSrv service 134, bulletin board service 132) by again accessing the temporary tree edit object 608. In the preferred embodiment, the FillSPForNewNode function calls the GetNewObjectType function in the temporary tree edit object 608. In one embodiment, the GetNewObjectType function accesses and returns the node type stored in the temporary tree edit object 608. In other embodiments, however, the GetNewObjectType function can include customized programmed instructions.

Proceeding to state 1608, the FillSPForNewNode function gets the security token 220 of the parent node. The FillSPForNewNode function obtains the parent node security token 220 by obtaining the security node existing in the node pointer object 606. As discussed above, the node pointer object 606 references the parent node in the on-line network 100 and contains the security token 220 of the parent node.

Proceeding to state 1610, the FillSPForNewNode function obtains the list of properties such as the flags 214, the icon identifier 214, the node name 210, the node type and the parent node security token 220. The FillSPForNewNode function then proceeds to return state 1612. Thus, the unique implementation of the FillSPForNewNode function accesses the customized node editing functions in the temporary tree edit object 608 to obtain the list of properties for the new node. In return state 1612, the FillSpForNewNode function returns control back to the CreateNewChild function.

Referring now to FIG. 15, after obtaining a new node properties list in state 1502, the CreateNewChild function proceeds to state 1504. In state 1504, the CreateNewChild function determines whether the new child node is associated with a junction point node 208. In the preferred embodiment, the CreateNewChild function calls the HRJunctionPoint function in the temporary tree edit object 608. The HRJunctionPoint function accesses and returns the value of the junction point flag 704 in the temporary tree edit object 608.

If the new child node is associated with a junction point node 208, the CreateNewChild function proceeds to state 1506. For example, if the new child node is a node in the bulletin board service namespace 136b, the junction point flag 704 in the tree edit object 608 is set to true. Accordingly, the present invention can create a new junction point node 208 in the main catalog of the DirSrv namespace 136b that references the new child node in the bulletin board service namespace 136a.

In state 1506, the CreateNewChild function determines whether the target node of the junction point node 208 already exists. A target node is the node referenced by the junction point node 208. For example, when the movies review junction point node 208 in the DirSrv service 134 references the movie reviews bulletin board node 204f, the movie reviews bulletin board node 204f is said to be the target of the junction point node 208.

If the target of a junction point node 208 already exists, the CreateNewChild function proceeds to state 1508 and obtains the directory entry identifier 232 of the target node. In the preferred embodiment, it is possible for many junction point nodes 208 to reference a single target node. For example if the movie reviews bulletin board node 204f already exists, the CreateNewChild node obtains its directory entry identifier 232. If the target node already exists, the CreateNewChild function only needs to create a new junction point node 208 in the DirSrv namespace 136b that references the existing target node.

Returning to state 1506, if the target node does not exist, the CreateNewChild function proceeds to state 1510. In state 1510, the CreateNewChild function creates the target node. In the preferred embodiment, the CreateNewChild function calls the AddJunctionPoint function in the temporary tree edit object 608. The AddJunctionPoint function uses the list of properties to create the target node. For example, if the movie reviews bulletin board node 204f does not exist, the AddJunctionPoint function creates the movies reviews bulletin board node 204f.

While in state 1510, the AddJunctionPoint function calls the AddNode function in the tree modification interface object 610 and passes the list of properties for the new bulletin board node. The AddNode function then sends the list of properties to the service application via a remote procedure call that directs the service application to create a new node. In response, the service application uses the list of properties to create the target node.

For example, if the system operator desires to create the movie reviews bulletin board node 204f, the AddJunctionPoint function calls the AddNode function in the tree modification interface object 610 and passes the list of properties for the movie reviews bulletin board 208. The AddNode function sends the list of properties to the bulletin board service 132 via a remote procedure call that directs the bulletin board service 132 to create a new node. In response, the bulletin board service 132 creates the movie reviews bulletin board node 204f based on the list of properties.

When creating the node, the bulletin board service 132 assigns a new directory identifier to the node. The bulletin board service 132 then sends the directory identifier back to the AddNode function in the tree modification interface object 610. The AddNode function passes the directory identifier back to the AddJunctionPoint function in the tree edit object 608. The AddJunctionPoint function then stores the directory identifier and the junction point flag 704 in the list of properties and returns control back to the CreateNewChild function.

Proceeding to state 1512, the CreateNewChild function creates a node in the main content catalog of the DirSrv namespace 136b. After creating a node in another namespace 136, the present invention creates a node in the DirSrv namespace 136b in order to provide a main content catalog that references all the nodes in the on-line network 100. While in state 1512, the CreateNewChild function can create (1) a DirSrv junction point node 208, (2) a DirSrv folder node 204 or (3) a DirSrv leaf node 206. The list of properties indicate which type of node to create. For example, if the system operator desires to create a junction point node 208, the list of properties includes the junction point flag 704.

While in state 1512, the CreateNewChild function in the preferred embodiment calls the AddNode function in the tree modification interface object 610 and passes the list of properties for the new DirSrv node to the AddNode function. While in state 1512, the AddNode function directs the DirSrv service 134 to create a new node. If the list of properties includes the junction point flag 704, the DirSrv service 134 creates a junction point node 208 and loads the directory entry identifier 232 of the target node into the junction point node 208. For example, the DirSrv service 134 creates the movie reviews junction point node 208 and loads the directory identifier of the movies review bulletin board node 204f (the target node) into the new junction point node 208.

If the list of properties does not include the junction point flag 704, the DirSrv service 134 checks the application identifier 230 in the list of properties. If the application identifier 230 matches the application identifier 230 assigned to the DirSrv service 134, the DirSrv service 134 creates a new folder node 204. For example, the DirSrv service 134 could create a new folder node 204 on science fiction movies.

For leaf nodes, the application identifier 230 in the list of properties specifies a non-hierarchical service. Thus, if the system operator desires to create a movies chat room leaf node 206a, the DirSrv service 134 uses the list of properties to create a leaf node 206 which identifies the desired chat room in the chat service 130. The AddNode function then returns control back to the CreateNewChild function.

Proceeding to state 1514, the CreateNewChild function determines whether a non-hierarchically organized service needs updating. For example, when the CreateNewChild function creates a leaf node 206 which references a new chat room, the CreateNewChild function also notifies the chat service 130 that a new chat room leaf node 206a exists. In the preferred embodiment, the CreateNewChild function calls the HRNeedDec function in the temporary tree edit object 608 to determine if the new leaf node 206 relates to a non-hierarchically organized service. The HRNeedDec function determines the type of node from the node flags 214 and the type of service from the application identifier 230.

In the present embodiment, the HRNeedDec function checks the application identifier 230 of the new node to determine whether the new node references a hierarchically organized service namespace 136 or a non-hierarchically organized service such as the chat service 130. If the new node references a hierarchically organized service namespace 136 (i.e., the new node is a junction point node 208 or a folder node 204) the CreateNewChild function proceeds to return state 1516.

If the new node references a non-hierarchically organized service (i.e., a leaf node 206) the CreateNewChild proceeds to state 1518. For example, if the application identifier 230 of the new node specifies the chat service 130, the HRNeedDec function returns a true value and the CreateNewChild function proceeds to state 1518.

The preferred embodiment describes the default implementation of the HRNeedDec function. In the other embodiments, however, a customized HRNeedDec function could implement a non-hierarchically organized service that does not need updating when new nodes are created. Thus in other embodiments, the HRNeedDec function can indicate that updating the non-hierarchical service is unnecessary.

In state 1518, the CreateNewChild function creates the data modification interface object 612. The data modification interface object 612 communicates with non-hierarchically organized service applications. In the preferred embodiment, the data modification interface object 612 sends editing commands to the non-hierarchical service applications which direct the service applications to create, modify and delete offerings within the non-hierarchical services.

Proceeding to state 1520, the CreateNewChild function updates the nonhierarchically organized service that a new node has been created. In the preferred embodiment, the CreateNewChild function calls the Add function existing in the data modification interface object 612. The data modification interface object 612 then communicates with the non-hierarchical service application via remote procedure calls which send an update command and the list of properties for the new node to the nonhierarchical service application. In response, the non-hierarchical service application creates the new offering. For example, once the chat service 130 receives the update command and the list of properties, the chat service 130 updates its chat room database 138.

After updating the non-hierarchical service, the CreateNewChild function proceeds to return state 1516. Thus, the unique implementation of the CreateNewChild function determines the proper node editor 304 for a new child node, automatically invokes the proper node editor 304, determines whether a new node references a hierarchical or non-hierarchical service and automatically creates the data structures necessary to communicate with the proper service. Further, the CreateNewChild function adds a reference to the new child node into the main catalog of the DirSrv service 134. In return state 1516, control is passed back to the NewObject function in the node pointer object 606 in state 1406. As illustrated in FIG. 14, the NewObject function then proceeds to return state 1408 and passes control back to the network shell 302.

c. Modification Of Node Properties

Figure 17:
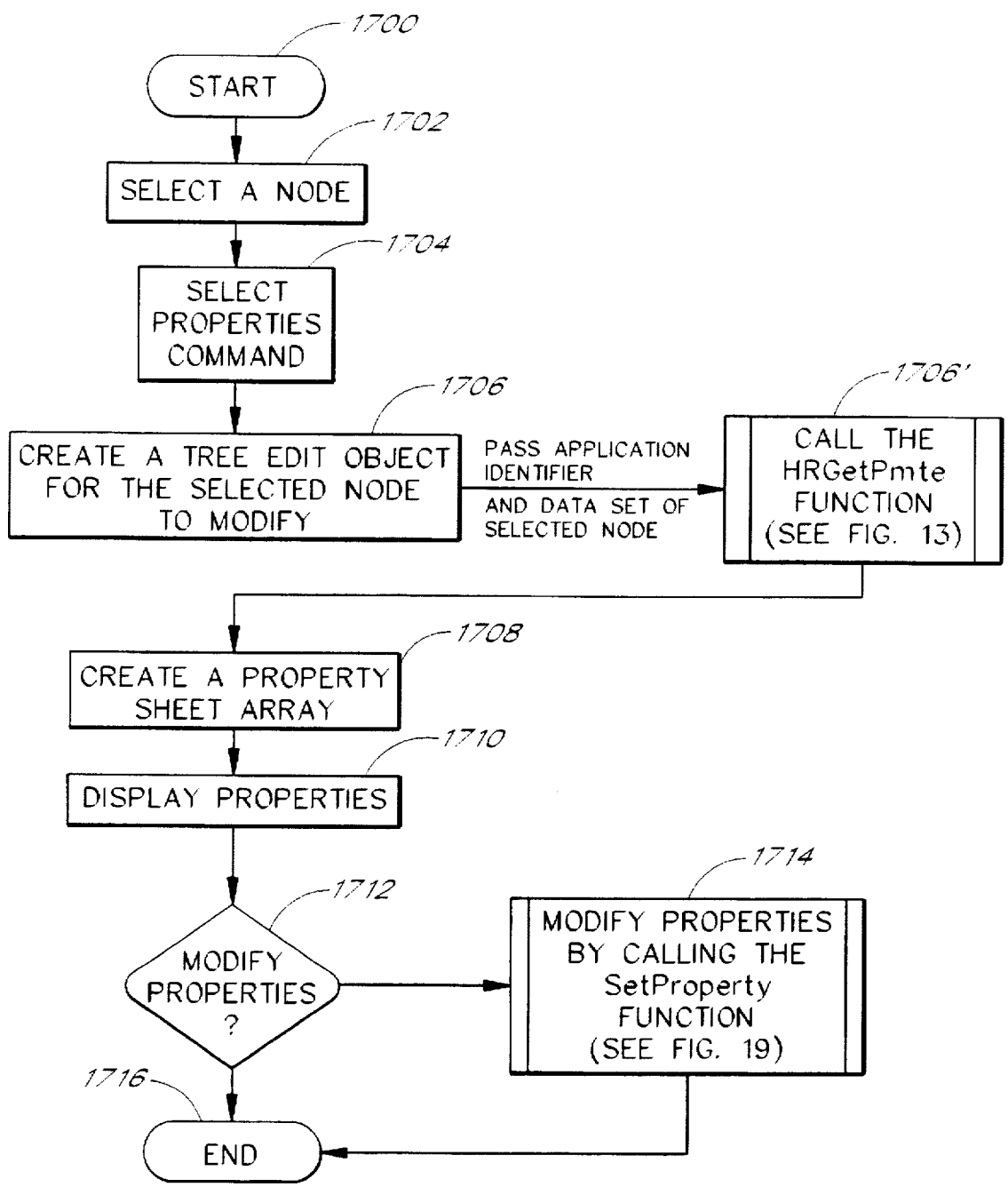
FIG. 17 is a flow chart illustrating the steps to display and modify the properties of a node in the on-line network of a preferred embodiment of the present invention.

FIG. 17 illustrates a flow chart of the sequence of states the present invention executes to modify a node's properties. Upon activation of an end-user's computer, in start state 1700, the computer loads the operating system and displays the operating system user interface or computer shell 300. When the end-user directs the computer shell 300 to access the on-line network 100 (for example, via a menu command or icon selection), the computer shell 300 invokes the network shell 302. The network shell 302 then creates the shell folder objects 604 and node pointer objects 606 for the nodes accessed by the end-user.

In addition, the network shell 302 displays the end-user interface illustrated in FIG. 4. The end-user interface includes the File menu 408. Proceeding to state 1702 the end-user a particular node and the present invention proceeds to state 1704 when the end-user directs the network shell 302 to display the properties associated with that node by pressing the right mouse key or by selecting the File/Properties command 506 in the File menu 408.

Figure 18A:

As illustrated in FIGS. 18A and 18B, the network shell 302 displays a node's properties as a set of property pages 1800. In this example, the first property page 1800 illustrated in FIG. 18A lists general properties such as the node's name 210, the go word 222, the category 224, price 226, description 218 and other properties. The second property page illustrated in FIG. 18B describes the type of content such as the language, topics, etc. In addition each property page 1800 contains an OK button 1802, a Cancel button 1804 and an Apply button 1806. The type of properties displayed in the property pages 1800, and the total number of property pages 1800 vary from node type to node type.

When an end-user selects a node in which the end-user does not have system operator access rights 900, the property pages 1800 are displayed as read only items. That is, an end-user can only view the properties. However, when the end-user selects a node in which the end-user has system operator access rights 900, the present invention allows the end-user to modify the properties. In some cases the editing system of the present invention also displays specialized system operator property pages 1800.

Proceeding to state 1706 as illustrated in FIG. 17, the network shell 302 directs the node pointer object 606 for the selected node to create a tree pointer object 608. In the preferred embodiment, the network shell 302 calls the HRGetPmte function and passes the application identifier 230 and the data set 806 of the selected node. As described above, the HRGetPmte function accesses the node editor 304 assigned to the application identifier 230 and directs the node editor 304 to create the tree edit object 608.

Proceeding to state 1708, the network shell 302 creates an array of handles that reference the general property sheets 1800 viewed by every user. While in state 1708, the network shell 302 also determines whether the end-user has system operator access rights 900. As discussed above, the system operator access rights 900 are determined by sending the user's account number and the node's security token 220 to the security service 150 in the on-line network 100.

Proceeding to state 1710, if the end-user does not have system operator access rights 900, the network shell 302 passes the array of property sheet handles to the computer shell 300. The computer shell 300 then uses techniques known to one of ordinary skill in the art to display the property pages. If the end-user has system operator privileges, the network shell 302 calls the AddNedPropPages function existing in the tree edit object 608. The AddNedPropPages function obtains the handles to the system operator property pages 1800 from the tree edit object 608. The AddNedPropPages function then adds the handles of the system operator property pages 1800 to the array of property handles. While in state 1710, the network shell 302 passes the array of property handles to the computer shell 300. The computer shell then displays both the general property pages 1800 and system operator property pages 1800.

Proceeding to state 1712, the present invention waits for the system operator to modify the properties. For example, the system operator could change the description 218 or the price 228 associated with the node. If the system operator does not make any modifications, the system operator presses the OK button 1802 or the Cancel button 1804 and the network shell 302 proceeds to end state 1716.

Figure 19:
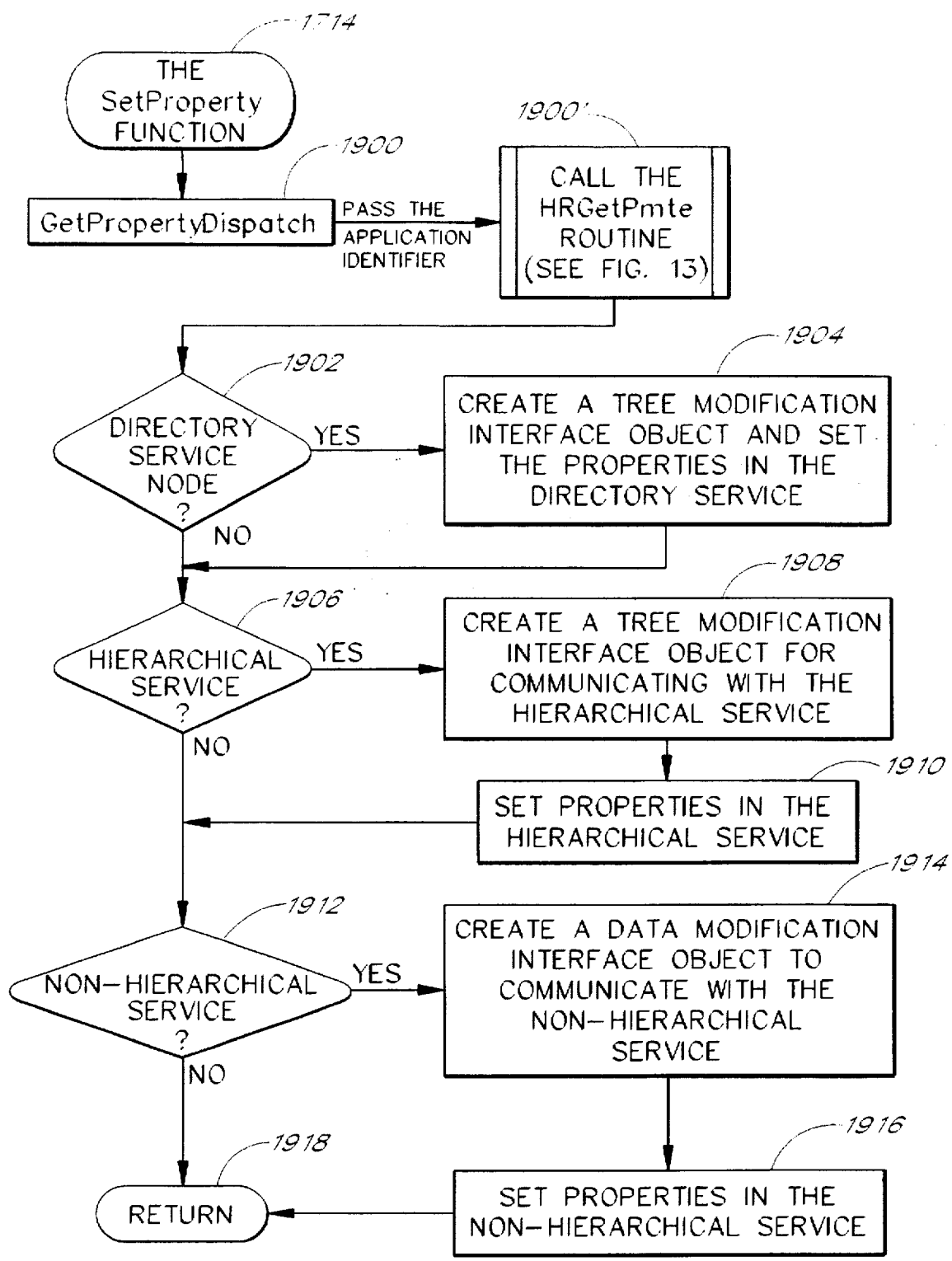
FIG. 19 is a flow chart illustrating a routine which sets properties in a preferred embodiment of the present invention.

If the system operator does make modifications, the system operator presses the Apply button 1806. The network shell 302 then proceeds to state 1714 and calls the SetProperty function existing in the node pointer object 606. FIG. 19 illustrates a flow chart of the SetProperty function in the presently preferred embodiment. The SetProperty function executes the states necessary to direct with the on-line network 100 to modify the altered properties.

Beginning in a start state 1714, the SetProperty function proceeds to state 1900 and obtains three property flags called a pdlNode flag, a pdlDelegate flag and a pdlService flag. In the preferred embodiment, the SetProperty function calls the GetPropertyDispatch Function in the node pointer object 606. The GetPropertyDispatch function proceeds to state 1901 and calls the HRGetPmte function. When calling the HRGetPmte function, the GetPropertyDispatch function passes the application identifier 230 of the node selected for modification. The HRGetPmte function creates a tree edit object 608 for the node and obtains the property flags.

The pdlNode flag indicates that the modified properties relate to a node in the DirSrv namespace 136b. The pdlDelegate flag indicates that modified properties relate to a node in a hierarchical service application such as the bulletin board service 132. The pdlService flag indicates that the modified properties relate to a node in a non-hierarchical service application such as the chat service 130. The SetProperty function sets the flags 216 based on the type of node the node pointer object 606 references.

Proceeding to state 1902, the SetProperty function determines whether the modified properties relate to a node in the DirSrv service 134. If the pdlNode flag is set (the modified properties relate to a node in the DirSrv namespace 136b) the SetProperty function proceeds to state 1904 and creates a tree modification interface object 610 which communicates with the DirSrv service 134.

While in state 1904, the tree modification interface object 610 sends the modified properties and a set property command via a remote procedure call to the DirSrv service 134. In the preferred embodiment, the SetProperty function calls the SetTreeProperties function existing in the tree modification interface object 610 and the SetTreeProperties function sends the set property remote procedure call to the DirSrv service 134. In response, the DirSrv service 134 modifies the node by changing the specified properties.

Proceeding to state 1906, the SetProperty function determines whether the modified properties relate to a node in another hierarchical service namespace 136 such as the bulletin board service namespace 136a. If the pdlDelegate flag is set (the modified properties relate to a node in a hierarchical namespace 136 other than the DirSrv namespace 136b such as the bulletin board service namespace 136a), the SetTreeProperties function proceeds to state 1908 and creates another tree modification interface object 610 which communicates with the specified hierarchical service namespace 136.

Proceeding to state 1914, the tree modification interface object 610 sends the modified properties and a set property command via a remote procedure call to the hierarchical service application. In response, the hierarchical service application modifies the node by changing the specified properties.

Proceeding to state 1912, the SetProperty function determines whether the modified properties relate to a node in a non-hierarchical service such as the chat service 130. If the pdlService flag is set (the modified properties relate to a non-hierarchical service), the SetProperty function proceeds to state 14 and creates a data modification interface object 612 which communicates with the specified non-hierarchical service namespace 136.

Proceeding to state 1916, data modification interface object sends the modified properties and a set property command via a remote procedure call to the non-hierarchical service application. In the preferred embodiment, the SetProperty function calls the SetDataProperties function in the data modification interface object 612 and the SetDataProperties function sends the set properties remote procedure call to the non-hierarchical service application. In response, the non-hierarchical service application modifies the node by changing the specified properties.

The present invention then proceeds to return state 1918 which returns control back to the network shell 302. Thus the present invention integrates the system operator menus for modifying the property pages 1800 with the operating system of the local computer 102, determines whether the modified node exists in a hierarchical or non-hierarchical service and creates the data structures necessary to communicate the modifications to the proper service.

b. Deletion Of A Node

Figure 20:
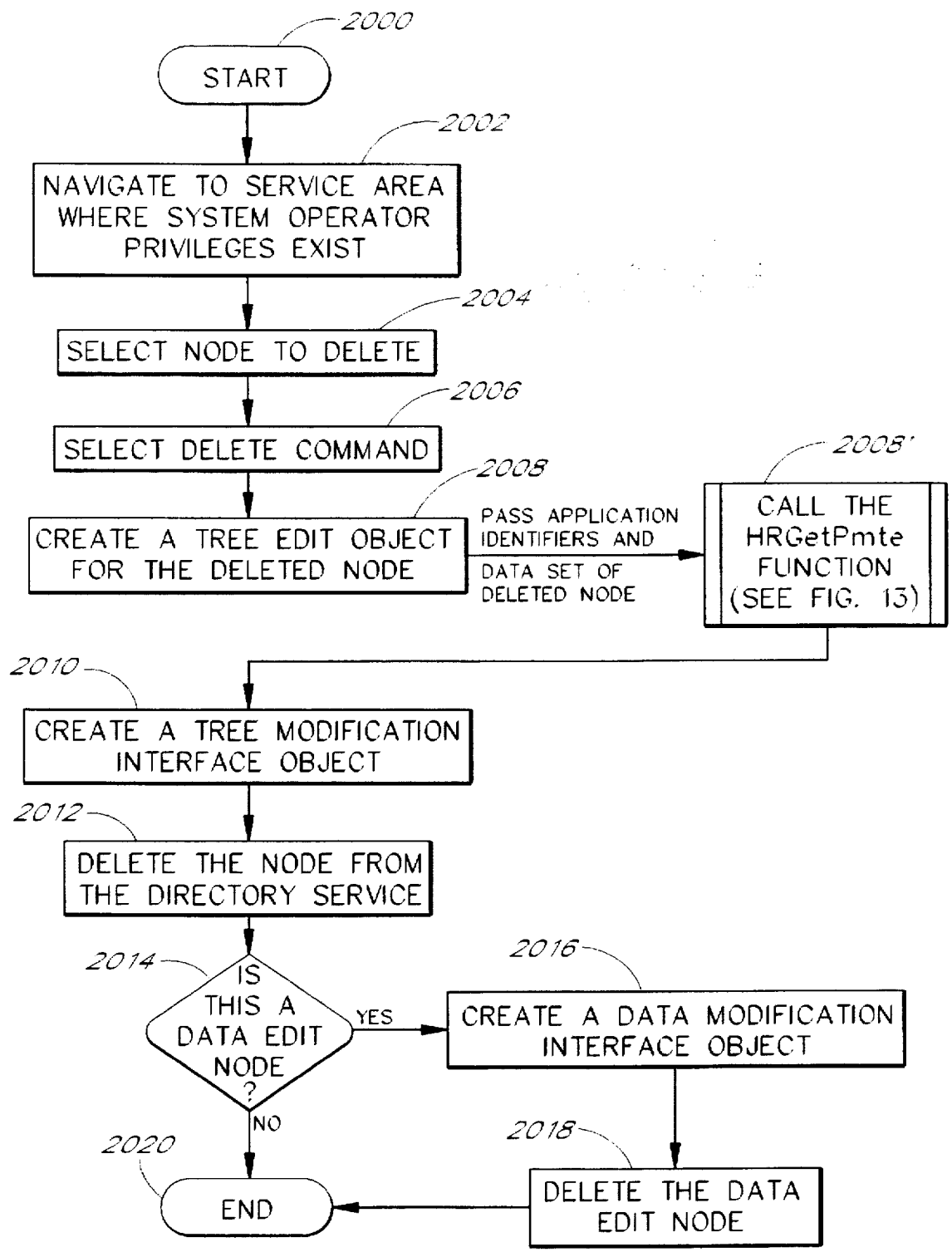
FIG. 20 is a flow chart illustrating the steps to delete a node in one presently preferred embodiment of the present invention.

FIG. 20 illustrates a flow chart of the sequence of states the present invention executes to delete a node from the on-line network 100. Upon activation of an end-user's computer, in start state 2000, the computer loads the operating system and displays the operating system user interface or computer shell 300. When the end-user directs the computer shell 300 to access the on-line network 100 (for example, via a menu command or icon selection), the computer shell 300 invokes the network shell 302. The network shell 302 creates the shell folder objects 604 and node pointer objects 606 for the nodes accessed by the end-user.

Proceeding to state 2002, the editing system of the present invention confirms that the end-user has system operator access rights 900 as discussed above and displays the File/Delete command 502 in the File menu. To delete a node, the system operator selects a node in state 2004 and proceeds to state 2006 where the system operator selects the File/Delete command 502 or alternatively, the system operator can press the delete key on his computer keyboard.

Once a system operator selects a node and enters the File/Delete command 504, the network shell 302 proceeds to state 2008. In state 2008, the network shell 302 calls the HRGetPmte function and passes the application identifier 230 and data set 806 of the selected node. As described above, the HRGetPmte function accesses the node editor 304 assigned to the application identifier 230 and directs the node editor 304 to create the tree edit object 608.

Proceeding to state 2010, the network shell 302 creates a tree modification interface object 610. The tree modification interface object 610 directs the service associated with the selected node to delete the node. For example, if the system operator deletes a node in the DirSrv service 134, the present invention creates a tree modification interface object 610 which communicates with the DirSrv service 134.

Proceeding to state 2012, the network shell 302 directs the tree modification interface object 610 to delete the selected node by calling a DeleteNode function in the tree modification interface object 610. The tree modification interface object 610 then sends a delete command and information about the selected node to the DirSrv service 134 via a remote procedure call. In response, the service application deletes the node from its service namespace 136.

Proceeding to state 2014, the present invention determines if the deleted node in the DirSrv service 134 referenced a non-hierarchical service by calling the HRNeedDec function in the tree edit object 610. The HRNeedDec function returns a true value if the application identifier 230 identifies a non-hierarchical service. If the deleted DirSrv node referenced a non-hierarchical data service, the present invention proceeds to state 2016 and creates a data modification interface object 612 which communicates with the non-hierarchical data service.

Proceeding to state 2018 the present invention directs the data modification interface object 612 to delete the offering in the non-hierarchical service. In the preferred embodiment, the present invention calls the Delete function in the data modification interface. The data modification interface then generates the delete remote procedure call and sends the deleted node network identifier 212 to the non-hierarchical service. In response, the non-hierarchical service deletes the identified offering.

For example, the data modification interface object 612 sends a delete command and information about the deleted chat room to the chat service 130. In response, the chat service 130 deletes the reference to the deleted chat room from its chat room database 138. Thus the present invention integrates the system operator menus for deleting a node into the user's local operating system, determines the node editor 304 for a deleted node, whether a node exists in a hierarchical or non-hierarchical service and creates the data structures necessary to direct the proper service to delete the node. The present invention then proceeds to end state 2020.

While the above detailed description has shown, described and pointed out the fundamental novel features of the invention as applied to a preferred embodiment, it will be understood that various omissions and substitutions and changes in the form and details of the illustrated device may be made by those skilled in the art without departing from the spirit of the invention. Consequently, the scope of the invention should not be limited to the foregoing discussion but should be defined by the appended claims.

What is claimed is:

1. A system operator editing system for modifying the services provided by a computer network, comprising:

a plurality of on-line services existing in a computer network, said plurality of services comprising hierarchically organized services and non-hierarchically organized services, each of said services having a plurality of offerings accessible by a plurality of users;

a database existing in said network, said database containing a plurality of access identifiers, said access identifiers specifying access levels for said users with respect to said offerings, said access identifiers identifying one or more general access levels for said users and one or more editing access levels for one or more operators; and a plurality of editing modules, said editing modules in communication with said services, each of said editing modules configured to edit said offerings in one of said services, wherein said one or more of said operators are capable of accessing said editing modules to edit said offerings, each of said editing modules configured to provide editing functions based on said editing access levels.

2. The system operator editing system of claim 1, further comprising a network shell module existing in said end-user station, said network shell module in communication with said network and said editing modules, said network shell module adapted to identify which of said editor modules are configured to edit said offerings.

3. The system operator editing system of claim 2, wherein said network shell module accesses one of said editing modules in response to one of said users selecting one of said offerings.

4. The system operator editing system of claim 1, wherein said on-line services are uniquely identified with a service identifier and wherein said offerings associated with said services contain said service identifiers.

5. The system operator editing system of claim 4, wherein said end-user station contains an editor list that associates each of said service identifiers with one of said editing modules executing in said end-user station.

6. The system operator editing system of claim 5, further comprising a network shell module in said end-user station, said network shell module in communication with said on-line service, said network shell module adapted to access said offerings and to obtain said service identifiers from said offerings and wherein said network shell module is further adapted to communicate with said editor list to identify said editing modules associated with said service identifiers.

7. The system operator editing system of claim 2, further comprising an offering information list existing in said end-user station, said offering information list containing a name for each of said offerings provided by said services.

8. The system operator editing system of claim 7, wherein said editing modules communicate with said offering information list to create an editing menu.

9. The system operator editing system of claim 8 further comprising a computer shell module stored in said end-user station, said computer shell module in communication with said plurality of editing modules, wherein said computer shell module and said plurality of editing modules interact to display said editing menu.

10. A system operator editing system for an interactive network, comprising:

a plurality of editing modules, each of said editing modules in communication with a corresponding interactive service existing in a computer network, each of said editing modules configured to edit and organize a plurality of offerings associated with one of said interactive services; and a network shell module stored in said end-user station, said network shell module in communication with said editing modules and said network, said network shell module having a data structure that associates each of said editing modules with one or more of said interactive services, wherein said network shell module provides access to said editing modules when a user of said end-user station has access rights to edit and organize said offerings, said editing modules providing different editing interfaces in response to different access rights.

11. The system operator editing system of claim 10, wherein said editing modules are adapted to receive copies of said offerings from said interactive services, said editing modules editing said copies within said end-user station before sending said copies back to said interactive services.

12. The system operator editing system of claim 10, wherein each of said plurality of editing modules contain a plurality of data values that identify a plurality of properties associated with said offerings.

13. The system operator editing system of claim 10, wherein each of said editing modules contains a plurality of editing functions, said editing functions customized to edit said offerings in said corresponding interactive service.

14. The system operator editing system of claim 10, wherein said editing modules are further adapted to create editing menus.

15. The system operator editing system of claim 10, wherein said editing modules are further adapted to edit a plurality of properties associated with said offerings.

16. The system operator editing system of claim 10, wherein said editing modules are further adapted to obtain a name of one of said interactive services associated with one of said offerings.

17. The system operator editing system of claim 10, wherein said editing modules are further adapted to communicate with hierarchically organized on-line services.

18. The system operator editing system of claim 10, wherein said editing modules are further adapted to communicate with non-hierarchically organized interactive services.

19. The system operator editing system of claim 10, wherein said editing modules are further adapted to determine whether an interactive service is hierarchically organized.

20. The system operator editing system of claim 10, wherein said editing modules are further adapted to communicate with hierarchically organized interactive services in said interactive network.

21. The system operator editing system of claim 10, wherein said editing modules are further adapted to obtain a list of properties associated with at least one of said offerings.

22. The system operator editing system of claim 10, wherein said editing modules are further adapted to display a set of property pages associated with each of said offerings.

23. The system operator editing system of claim 10, wherein said editing modules are further adapted to create an icon for each of said offerings.

24. The system operator editing system of claim 10, wherein said editing modules are further adapted to determine a name of one of said offerings.

25. The system operator editing system of claim 10, wherein said editing modules are further adapted create a new offering in said end-user station and wherein said editing modules direct said on-line services to add said new offering to said on-line network.

26. The system operator editing system of claim 25, wherein said editing modules are further adapted to direct a hierarchically organized on-line service to add said new offering to said on-line network.

27. The system operator editing system of claim 25, wherein said editing modules are further adapted to direct a non-hierarchically organized interactive service to add said new offering to said on-line network.

28. The system operator editing system of claim 10, wherein said editing modules are further adapted to delete an offering from a hierarchically organized interactive service in said on-line network.

29. The system operator editing system of claim 10, wherein said editing modules are further adapted to delete an offering from a non-hierarchically organized interactive service in said interactive network.

30. A system operator editing system for modifying the services provided by an interactive network, comprising:

a computer network providing a plurality of services having a plurality of offerings associated therewith;

an access database in said network, said access database adapted to store a plurality of access values, said access values specifying different access levels for a plurality of users with respect to said offerings, said access levels including a general access level for said users and a plurality of editing access levels for limited groups of said users;

a content data structure in said network which organizes said offerings into different content categories, said content categories linking offerings associated with one service with offerings associated with a second service; and a plurality of editing modules, said editing modules in communication with said services, each of said editing modules configured to edit said offerings associated with one of said services, wherein said editing modules process different editing commands based on said access level assigned to said limited group of said users.

31. The system operator editing system of claim 30, wherein said content categories are adapted to link offerings associated with a non-hierarchically organized service with offerings associated with a hierarchically organized service.

32. The system operator editing system of claim 30, wherein said access values specify said general access level for one of said users with respect to said offerings existing in one of said content categories, whereby said user can access said editing modules when said user selects said offerings in said content category.

33. The system operator editing system of claim 32, further comprising a network shell module existing in said end-user station, said network shell module in communication with said network and said editing modules, said network shell module adapted to identify which of said editor modules are configured to edit said offerings in said content category.

34. The system operator editing system of claim 33, wherein said network shell module accesses one of said editing modules in response to said user selecting one of said offerings in said content category.

35. The system operator editing system of claim 30, wherein said network further comprises:

a plurality of servers interconnected by a local area network, each server running at least one of said services, different groups of said servers providing different types of said services; and a plurality of gateway computers connected to said servers by said local area network and connected to said end-user station via a wide area network, each gateway computer programmed to receive service requests from said end-user station and to route said service requests to application servers running corresponding service applications.

36. An object-oriented system operator editing system for modifying the services provided by an interactive network, comprising:

a computer shell object stored in an end-user station, said computer shell object part of an operating system in said end-user station, said computer shell object adapted to display a user interface;

a plurality of network shell objects stored in said end-user station, said network shell objects in communication with said computer shell object, said network shell objects corresponding to different offerings in a computer network; and a plurality of editing objects stored in said end-user station, said editing objects in communication with said network shell objects, said computer shell object and a plurality of services, each of said editing objects adapted to edit said offerings within one of said services, each of said editing objects configured to provide a different graphical user interface based on access rights to said offering granted to an end-user.

37. The object-oriented system operator editing system of claim 36 wherein each of said editing objects includes elements for creating new offerings in one of said services.

38. The object-oriented system operator editing system of claim 36 wherein each of said editing objects includes elements for modifying said offerings in one of said on-line services.

39. The object-oriented system operator editing system of claim 36 wherein each of said editing objects includes elements for deleting said offerings in one of said services.

40. The object-oriented system operator editing system of claim 36, wherein said network shell object contains a data structure that associates each of said editing objects with one of said services, wherein said network shell object provides access to said editing objects when said user of said end-user station has access rights to edit and organize said offerings.

41. The object-oriented system operator editing system of claim 36, further comprising an offering information list existing in said end-user station, said offering information list containing a name for each of said offerings provided by said services.

42. The object-oriented system operator editing system of claim 41, wherein said editing objects communicate with said offering information list to create an editing menu.

43. A system operator editing system for modifying the services provided by an interactive network to a user, comprising:

a plurality of editing means for communicating with services in computer network, each of said services containing a data structure that organizes a plurality of offerings into a plurality of content categories, each of said editing means configured to modify the organization of said offerings in one of said services, each of said editing means further identified with a unique identifier; and a network shell means for storing a plurality of identifiers corresponding respectively to one of said editing means, said network shell means in communication with said offerings, said network shell means obtaining an identifier from one of said offerings, wherein said network shell means responds to said identifier to direct said identified editing means to edit said offering, said editing means providing a plurality of editing command sets to edit said offering said editing means using a user access code to select one of said editing command sets.

44. The system operator editing system of claim 43 further comprising a computer shell means stored in an end-user station, said computer shell means part of an operating system in said end-user station, said computer shell means adapted to display a user interface, said computer shell means and said plurality of editing means interact to display properties associated with said offerings in said user interface.

45. The system operator editing system of claim 43 further comprising a computer shell means stored in an end-user station, said computer shell means part of an operating system in said end-user station, said computer shell means adapted to display a user interface, said computer shell means and said plurality of editing means interact to display an editing menu in said user interface.

46. The system operator editing system of claim 45 wherein said editing menu lists the types of said offerings said editing means can create.

47. A method of modifying the services provided by an interactive, on-line network comprising the steps of:

accessing an offering in a computer network, said offering associated with a service;

determining that a user at an end-user station has an access right to edit at least one property associated with said offering;

sending an identifier to said end-user station, said identifier identifying said offering, said identifier further identifying an editor residing in said end-user station; and invoking said identified editor in said end-user station to permit the editing of said property associated with said offering, said editor adjusting a user interface based on said access right.

48. The method of claim 47, wherein said step of invoking said identified editor further comprises the step of accessing an editor list that associates said identifier with said editor.

49. The method of claim 47, further comprising the steps of:

creating a copy of said offering in said end-user station;

editing the properties associated with said copy; and sending said copy of said offering back to said on-line network.

50. The method of claim 47, further comprising the step of displaying a set of property pages associated with said offering.

51. The method of claim 47, further comprising the step of deleting said offering with said editor.

52. The method of claim 47 further comprising the step of editing the name of said offering.

53. The method of claim 47, further comprising the steps of:

accessing a second offering in said on-line network, said second offering associated with a second service;

determining that said user has an access right to modify at least one property associated with said second offering;

sending a second identifier to said end-user station, said second identifier identifying said second offering, said second identifier further identifying a second editor residing in said end-user station; and invoking said second editor in said end-user station to modify said property associated with said second offering.

54. A method of modifying the services in an interactive, computer network comprising the steps of:

accessing one of a plurality of offerings in a computer network, said network providing a data structure that organizes said offerings into different content categories, said offerings within said content categories associated with a plurality of access rights;

determining in said network that a user at an end-user station has an access right to modify offerings to a particular content category;

invoking an editor in said end-user station; and providing editing capabilities corresponding to said access rights.

55. The method of claim 54 further comprising the step of accessing an offering information list, said offering information list associating said new offering with a unique identifier.

56. The method of claim 55 wherein said step of invoking said editor invokes said editor identified by said editing information list.

57. The method of claim 54, further comprising the step of determining whether said new offering is associated with a hierarchically organized service.

58. The method of claim 54, further comprising the step of determining whether said new offering is associated with a non-hierarchically organized service.

59. The method of claim 54, further comprising the step of creating a new offering in said end-user station and directing one of said services to add said new offering to said content category.

* * * * *

UNITED STATES PATENT AND TRADEMARK OFFICE
CERTIFICATE OF CORRECTION

PATENT NO. : 5,794,006
DATED : August 11 1998
INVENTOR(S) : David S. Sanderman

It is certified that error appears in the above-identified patent and that said Letters Patent is hereby corrected as shown below:

At Col. 37, line 10, please delete " on-line" and insert --interactive--.

At Col. 39, line 3, please add a comma after "offering".

Signed and Sealed this

Fourth Day of May, 1999

Attest:

Q. TODD DICKINSON

Attesting Officer    Acting Commissioner of Patents and Trademarks